United States Patent
Tomita

(10) Patent No.: US 10,437,544 B2
(45) Date of Patent: Oct. 8, 2019

(54) PROJECTION SYSTEM AND METHOD FOR CONTROLLING PROJECTION SYSTEM

(71) Applicant: SEIKO EPSON CORPORATION, Tokyo (JP)

(72) Inventor: Kenichiro Tomita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/824,130

(22) Filed: Nov. 28, 2017

(65) Prior Publication Data

US 2018/0150273 A1  May 31, 2018

(30) Foreign Application Priority Data

Nov. 30, 2016 (JP) .................................. 2016-232195

(51) Int. Cl.
| | | |
|---|---|---|
| G06F 3/14 | (2006.01) | |
| G06F 3/0354 | (2013.01) | |
| G06F 3/042 | (2006.01) | |
| G09G 5/12 | (2006.01) | |

(52) U.S. Cl.
CPC ........ G06F 3/1423 (2013.01); G06F 3/03545 (2013.01); G06F 3/0425 (2013.01); G09G 5/12 (2013.01); G09G 2354/00 (2013.01); G09G 2360/04 (2013.01)

(58) Field of Classification Search
CPC combination set(s) only.
See application file for complete search history.

(56) References Cited

U.S. PATENT DOCUMENTS

| | | | |
|---|---|---|---|
| 2014/0292647 A1 | 10/2014 | Murase et al. | |
| 2016/0295184 A1* | 10/2016 | Ishikawa | H04N 9/3185 |
| 2017/0127028 A1* | 5/2017 | Oike | H04N 9/3147 |
| 2017/0295349 A1* | 10/2017 | Kasuga | H04N 9/3147 |
| 2017/0310937 A1* | 10/2017 | Wada | H04N 9/3179 |

FOREIGN PATENT DOCUMENTS

| | | |
|---|---|---|
| JP | 2000-10189 A | 1/2000 |
| JP | 2005-31270 A | 2/2005 |
| JP | 2007-102055 A | 4/2007 |
| JP | 2009-087101 A | 4/2009 |
| JP | 2011-170279 A | 9/2011 |
| JP | 2014-178375 A | 9/2014 |
| JP | 2014-204196 A | 10/2014 |
| JP | 2015-47885 A | 3/2015 |
| JP | 2015-61241 A | 3/2015 |
| JP | 2018-088663 A | 6/2018 |

* cited by examiner

Primary Examiner — Van N Chow
(74) Attorney, Agent, or Firm — Oliff PLC

(57) ABSTRACT

A projection system includes a first projector that projects an image based on image data in a first projection direction, a second projector that projects an image based on image data in a second projection direction, and a storage section that stores the image data representing the image projected by the first projector. The projection system can switch the image projected by the second projector to the image based on the image data stored in the storage section.

12 Claims, 9 Drawing Sheets

PROJECTION SYSTEM AND METHOD FOR CONTROLLING PROJECTION SYSTEM

CROSS-REFERENCE

The entire disclosure of Japanese Patent Application No. 2016-232195, filed Nov. 30, 2016 is expressly incorporated by reference herein.

BACKGROUND

1. Technical Field

The present invention relates to a projection system and a method for controlling the projection system.

2. Related Art

In a projector of related art, to allow a large amount of information to be displayed, there is a known projector that projects a plurality of images on a single projection surface (see JP-A-2000-10189, for example). The projector described in JP-A-2000-10189 displays two images on a single screen, an image supplied from a personal computer or any other external information apparatus and an image captured with a document camera.

There is a demand for increase in the amount of information projected by a projector. For example, it is conceivable that when a projected image is changed, the image before the change is also projected for comparison purposes. To achieve the requirement by using a projector of related art, for example, the images need to be reduced in size before projected.

SUMMARY

An advantage of some aspects of the invention is to allow a projector to increase the amount of information to be projected.

An aspect of the invention is directed to a projection system including a first projector that projects an image based on image data in a first projection direction, a second projector that projects an image based on image data in a second projection direction, and a storage section that stores the image data representing the image projected by the first projector, and the image projected by the second projector is allowed to be switched to the image based on the image data stored in the storage section.

According to the aspect of the invention, an image projected by a projector can be projected by another projector. Therefore, the image projected by the projector can be changed to another image, and the image before the change can be projected by the other projector, whereby the number of images projected by the projectors can be substantially increased. The projectors can therefore project a larger amount of information.

The projection system according to the aspect of the invention may further include an acceptance section that accepts an instruction input, and the image projected by the second projector may be switched to the image based on the image data stored in the storage section in accordance with the instruction input accepted by the acceptance section.

According to the aspect of the invention with this configuration, switching the image projected by the second projector to the image based on the image data stored in the storage section in accordance with the instruction input allows the second projector to project the image projected by the first projector. The second projector therefore does not need to be set in advance at the state in which no image is projected, whereby convenience provided by the projection system can be improved.

Another aspect of the invention is directed to a projection system including a first projector including a first acquisition section that acquires image data, first projection section that projects an image based on the image data acquired by the first acquisition section, a first storage section that stores the image data representing the image projected by the first projection section, and a first communication section that transmits the image data stored in the first storage section to the second projector, and a second projector including a second acquisition section that acquires image data, a second projection section that projects an image based on the image data acquired by the second acquisition section, a second communication section that receives the image data from the first projector, and a second storage section that stores the image data received by the second communication section, and the second projector can perform an action in which the second projection section projects the image based on the image data acquired by the second acquisition section and an action in which the second projection section projects the image based on the image data stored in the second storage section with the two actions switched from one to the other.

According to the aspect of the invention, the image projected by the first projector can be projected by the second projector. Therefore, in a case where the image projected by the first projector is changed to another image, the image before the change can be projected by the second projector, whereby the number of images projected by the first projector can be substantially increased. The projectors can therefore project a larger amount of information.

In the projection system according to the aspect of the invention, the first projector may include a switching control section that produces control data that instructs the second projector to perform image switching and causes the first communication section to transmit the control data to the second projector, and the second projector, upon reception of the control data via the second communication section, may switch the action in which the second projection section projects the image based on the image data acquired by the second acquiring section to the action in which the second projection section projects the image based on the image data stored in the second storage section and vice versa.

According to the aspect of the invention with this configuration, transmission of the control data from the first projector allows the image projected by the second projector to be switched to the image projected by the first projector. The operation required to perform the projection image switching in the projection system can therefore be simplified, whereby the convenience provided by the projection system can be improved.

In the projection system according to the aspect of the invention, the first projector projects an image for operation based on data representing the image for operation and include an acceptance section that accepts operation performed on the image for operation projected by the first projection section, and the switching control section may produce the control data based on the operation accepted by the acceptance section and cause the first communication section to transmit the control data to the second projector.

According to the aspect of the invention with this configuration, operation using the image for operation can readily instruct projection image switching in the projection system.

In the projection system according to the aspect of the invention, the first projector may include a position detecting section that detects a position input and an image producing section that produces an image based on a position detected by the position detecting section. The first projection section may project an image based on combined image data formed of image data representing the image produced by the image producing section combined with the image data acquired by the first acquisition section. The first storage section may store the combined image data. The first communication section may transmit the combined image data stored in the storage section to the second projector.

According to the aspect of the invention with this configuration, in a case where a projector produces an image based on a position input and projects the image, the other projector can project a projection image containing the produced image.

In the projection system according to the aspect of the invention, the first projector may include a third projection section that projects an image in a direction different from a direction in which the first projection section projects an image, and the first projector can cause the third projection section to project an image based on the image data acquired by the first acquisition section and an image based on the image data stored in the first storage section with the two images switched from one to the other.

According to the aspect of the invention with this configuration, a projection image projected by a projector can be projected by the other projector, and the same projector can project the projection image in a different direction. Projection images projected in a plurality of directions can therefore be switched from one to another with high flexibility, whereby the convenience provided by the projection system can be further improved.

In the projection system according to the aspect of the invention, in a case where the third projection section displays the image based on the image data stored in the first storage section, the orientation of the image can be changed.

According to the aspect of the invention with this configuration, an image projected by a projector can be projected in an orientation that allows a person who views the image to readily visually recognize the image.

In the projection system according to the aspect of the invention, the second projector may include a fourth projection section that projects an image in a direction different from a direction in which the second projection section projects an image, and the second projector can cause the fourth projection section to project an image based on the image data acquired by the second acquisition section and an image based on the image data stored in the second storage section with the two images switched from one to the other.

According to the aspect of the invention with this configuration, a projection image projected by a projector can be projected by the other projector, and the same projector can project the projection image in a different direction. Projection images projected in a plurality of directions can therefore be switched from one to another with high flexibility, whereby the convenience provided by the projection system can be further improved.

In the projection system according to the aspect of the invention, in a case where the fourth projection section projects the image based on the image data stored in the second storage section, the orientation of the image can be changed.

According to the aspect of the invention with this configuration, an image projected by a projector can be projected in an orientation that allows a person who views the image to readily visually recognize the image.

Another aspect of the invention is directed to a method for controlling a projection system including a first projector that projects an image based on image data in a first projection direction and a second projector that projects an image based on image data in a second projection direction, the method including storing the image data representing the image projected by the first projector and switching the image projected by the second projector to the image based on the stored image data.

According to the aspect of the invention, an image projected by a projector can be projected by another projector. Therefore, the image projected by the projector can be changed to another image, and the image before the change can be projected by the other projector, whereby the number of images projected by the projectors can be substantially increased. The projectors can therefore project a larger amount of information.

Another aspect of the invention is directed to a method for controlling a projection system including a first projector that projects an image based on image data in a first projection direction and a second projector that projects an image based on image data in a second projection direction. The first projector causes a first acquisition section to acquire image data, projects an image based on the image data acquired by the first acquisition section, stores the image data on the projected image, and transmits the stored image data to the second projector, and the second projector causes a second acquisition section to acquire image data, projects an image based on the image data acquired by the second acquisition section, and receives the image data from the first projector, stores the received image data, and performs an action of projecting the image based on the image data acquired by the second acquisition section and an action of projecting the image based on the stored image data with the two actions switched from one to the other.

According to the aspect of the invention, the image projected by the first projector can be projected by the second projector. Therefore, in a case where the image projected by the first projector is changed to another image, the image before the change can be projected by the second projector, whereby the number of images projected by the first projector can be substantially increased. The projectors can therefore project a larger amount of information.

The aspect of the invention can be implemented in a variety of forms other than the projection system and the method for controlling the projection system described above. For example, to carry out the controlling method described above, the aspect of the invention can be implemented in the form of a program executed by a computer (or processor). The aspect of the invention can also be embodied, for example, in the form of a recording medium on which the program described above is recorded, a server apparatus that distributes the program, a transport medium that transports the program described above, or a data signal carrying the program described above embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
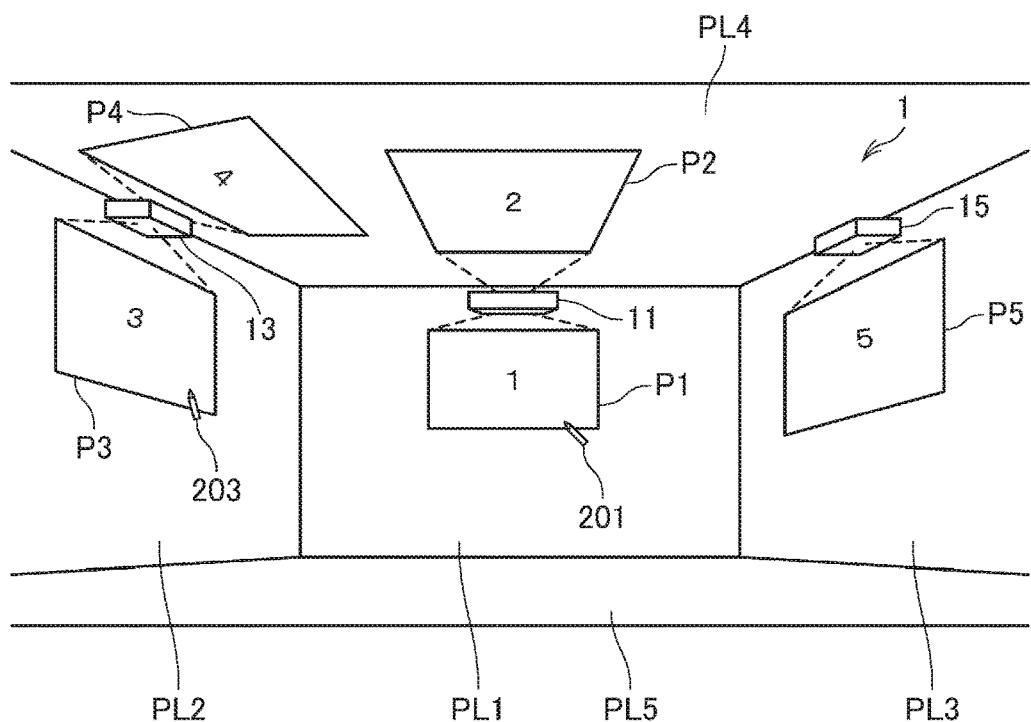
FIG. 1 is a schematic configuration diagram of a projection system according to an embodiment.
Figure 2:
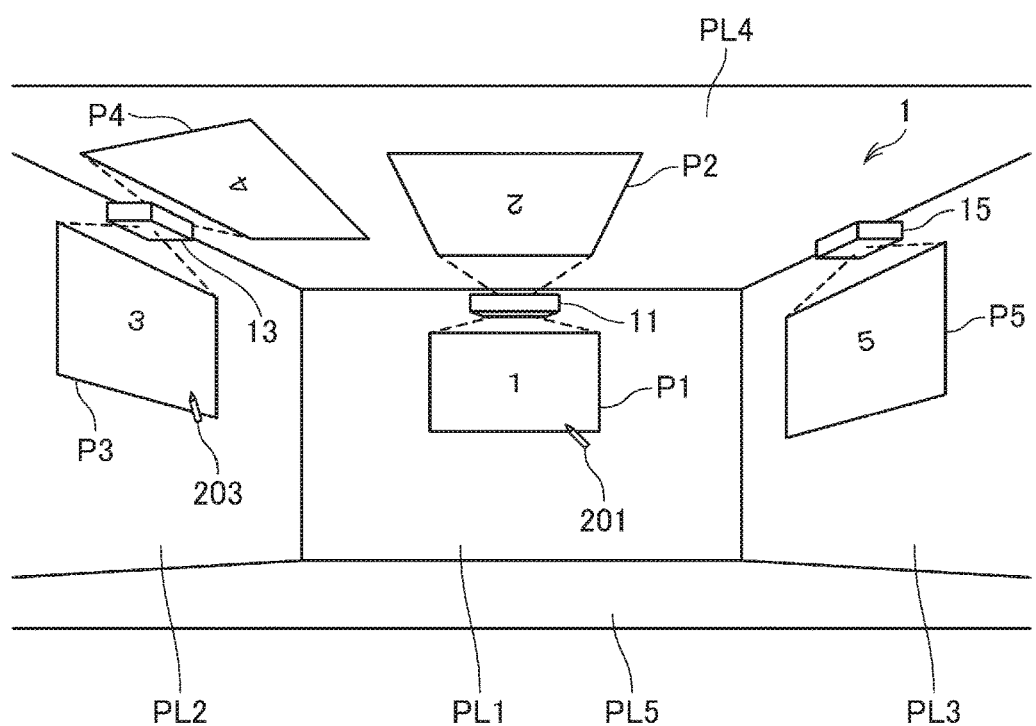
FIG. 2 is another schematic configuration diagram of the projection system.

FIGS. 1 and 2 are schematic configuration diagrams of a projection system 1 according to an embodiment to which the invention is applied.

The projection system 1 is a system including a plurality of projectors and includes three projectors 11, 13, and 15 in the present embodiment. The plurality of projectors 11, 13, and 15 are installed in the same room as shown, for example, in FIG. 1. The room where the projection system 1 is installed has walls, a ceiling, and a floor, and the walls and the ceiling are each formed of a flat surface and can be used as projection surfaces on which the projectors 11, 13, and 15 project projection images. In the following description, wall surfaces are called flat surfaces PL1, PL2, and PL3, a ceiling surface is called a flat surface PL4, and a floor surface is called a flat surface PL5. The projectors 11, 13, and 15 can each project image light on a projection surface, such as a wall surface, a curtain, and a plate, to form a projection image on the projection surface. In the present embodiment, the image light is projected on the flat surfaces PL1 to PL4 (projection surfaces). Each of the projection surfaces on which an image is projected is not limited to a flat surface and may instead be a curved surface. For example, it is conceivable that the projectors 11, 13, and 15 use a blackboard as each of the flat surfaces PL1, PL2, and PL3, and the ceiling surface on the other hand can be slightly curved so as to be readily viewed from a variety of positions in the room. In this case, the surface PL4 is a curved surface. The projectors 11 and 13 correspond to a first projector. The projectors 11, 13, and 15 correspond to a second projector.

The projectors 11, 13, and 15 can be arbitrarily changed in terms of details and installation states thereof. In the present embodiment, the projector 11 is fixed to the flat surface PL1, the projector 13 is fixed to the flat surface PL2, and the projector 15 is fixed to the flat surface PL3. That is, the projectors 11, 13, and 15 are each installed on a wall surface. The installation state is what is called wall-hanging installation. In this case, the projectors 11, 13, and 15 are close to the flat surfaces PL1, PL2, PL3, and PL4, which are projection surfaces. The projectors 11, 13, and 15 are each therefore preferably a short-focal-length projector, which is capable of proximity projection.

The projectors 11 and 13 can each project image light in two directions to project projection images. The projector 15 projects image light in one direction.

In the installation state shown in FIGS. 1 and 2, the projector 11 projects a projection image P1 on the flat surface PL1 and projects a projection image P2 on the flat surface PL4. The projector 13 projects a projection image P3 on the flat surface PL2 and projects a projection image P4 on the flat surface PL4. The projector 15 projects a projection image P5 on the flat surface PL3.

The projectors 11 and 13 can change the orientation of the projection images by using image processing that will be described later. For example, the projector 11 can switch the state of the projection image P2 projected on the flat surface PL4 between the state shown in FIG. 1 and the state shown in FIG. 2. The projection image P2 in FIG. 1 and the projection image P2 in FIG. 2 are turned upside down with respect to each other. In another expression, the projection image P2 in FIG. 1 is projected in the orientation in which the projection image P2 in FIG. 2 is rotated in the plane thereof by 180 degrees. Similarly, the projection image P4, which is projected by the projector 13 on the flat surface PL4, is projected in the orientation shown in FIG. 1 or the orientation shown in FIG. 2, which is the orientation in FIG. 1 rotated by 180 degrees. The state shown in FIG. 1 and the state shown in FIG. 2 can be switched from one to the other. The projectors 11 and 13 turn the projection images P2 and P4, which are projected on the flat surface PL4 (ceiling surface), upside down in accordance with the position of a person who views the projection images P2 and P4 to allow the viewer to readily view the projection images P2 and P4. For example, in a case where a person who views the projection image P2 is present immediately below the projector 11, the projector 11 may project the projection image P2 in such a way that the upper side of the image faces the side close to the flat surface PL1, as shown in FIG. 2.

In a case where any of the projectors 11, 13, and 15 projects an image on the flat surface PL4, which is the ceiling, or a rear-side wall surface (not shown) of the room where the projectors 11, 13, and 15 are installed, the projectors 11, 13, and 15 may project a horizontally reversed mirror image. For example, in a scene in which the installation room is a classroom or a lecture room, and a mirror is attached to a desktop used by pupils, students or lecture participants, the pupils, the students or the lecture participants can visually recognize a projection image projected on the flat surface PL4 or on the rear-side wall and displayed on the mirror in the proper orientation of the image without looking up at the ceiling or looking back but in a forward-facing posture.

Figure 3:
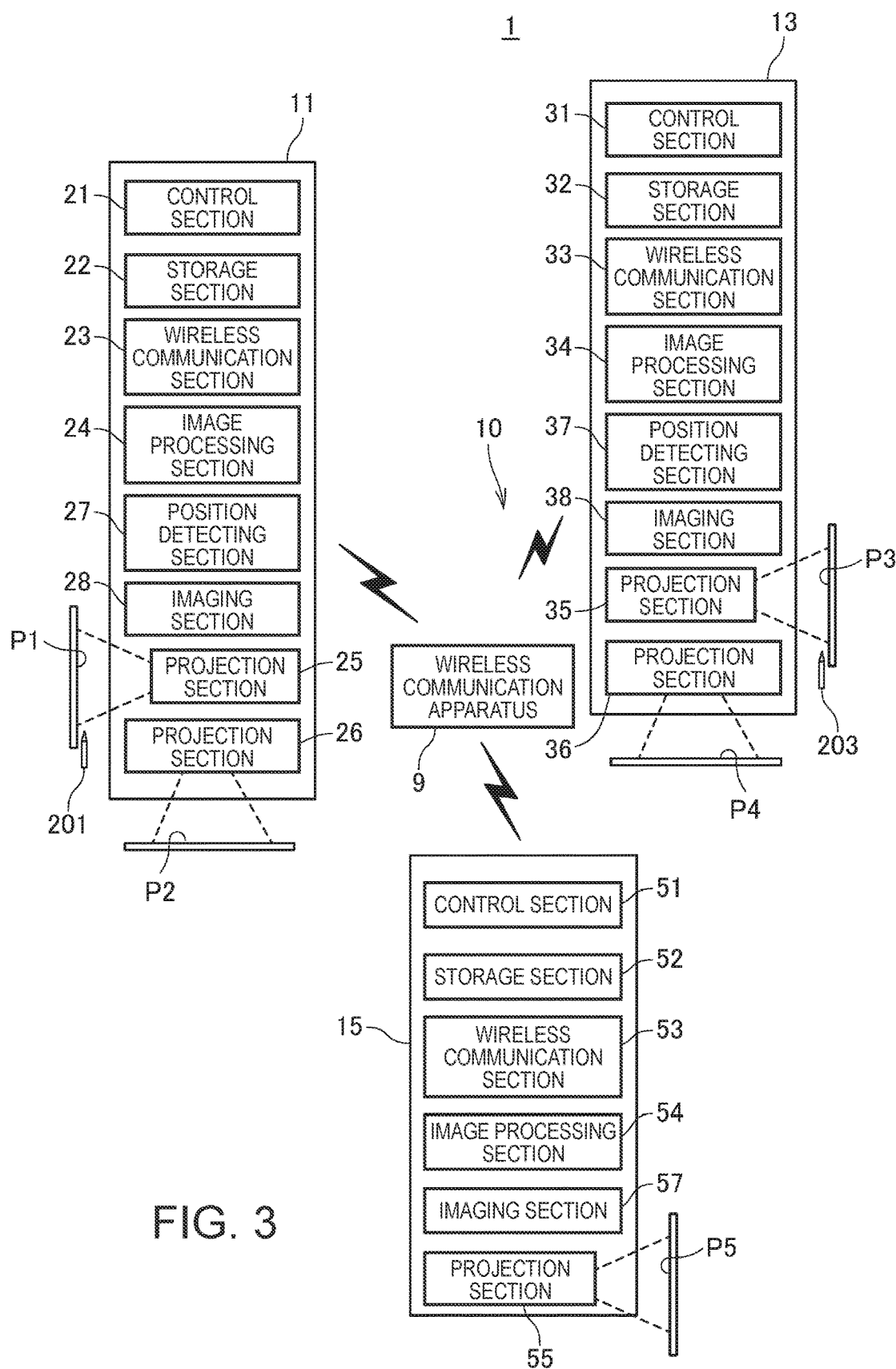
FIG. 3 is a functional block diagram of the projection system.

FIG. 3 is a functional block diagram of the projection system 1. FIG. 3 shows primary functional blocks that form the projectors 11, 13, and 15, and the configuration of each of the projectors will be described later in detail.

The projection system 1 includes a wireless communication apparatus 9, as shown in FIG. 3. The wireless communication apparatus 9 performs one-to-one wireless data communication with each of the projectors 11, 13, and 15 or achieves one-to-multiple wireless data communication among apparatus formed of the projectors 11, 13, and 15 and the wireless communication apparatus 9. The thus functioning wireless communication apparatus 9 forms a communication network 10, which allows two-way wireless data communication to be performed among the projectors 11, 13, and 15. Specifically, the wireless communication apparatus 9 can be an access point or a router in a wireless LAN (including Wi-Fi (registered trademark)). The wireless communication apparatus 9 may instead be configured to perform Bluetooth (registered trademark) or any other short-range wireless communication with the projectors 11, 13, and 15.

The projector 11 includes a control section 21, which controls each portion of the projector 11, a storage section 22, which stores a variety of data, a wireless communication section 23, which performs wireless data communication with the wireless communication apparatus 9, and an image processing section 24, which processes an image to be projected. The projector 11 further includes a projection section 25, which projects the projection image P1 on the flat surface PL1 (FIG. 1), and a projection section 26, which projects the projection image P2 on the flat surface PL4 (FIG. 1). The wireless communication section 23 performs wireless data communication, such as a wireless LAN (including Wi-Fi) and Bluetooth (registered trademark), over the communication network 10.

The projector 13 includes a control section 31, which controls each portion of the projector 13, a storage section 32, which stores a variety of data, a wireless communication section 33, which performs wireless data communication with the wireless communication apparatus 9, and an image processing section 34, which processes an image to be projected. The projector 13 further includes a projection section 35, which projects the projection image P3 on the flat surface PL2 (FIG. 1), and a projection section 36, which projects the projection image P4 on the flat surface PL4 (FIG. 1). The wireless communication section 33 performs wireless data communication, such as a wireless LAN (including Wi-Fi) and Bluetooth (registered trademark), over the communication network 10.

The projector 15 includes a control section 51, which controls each portion of the projector 15, a storage section 52, which stores a variety of data, a wireless communication section 53, which performs wireless data communication with the wireless communication apparatus 9, and an image processing section 54, which processes an image to be projected. The projector 15 further includes a projection section 55, which projects the projection image P5 on the flat surface PL3 (FIG. 1). The wireless communication section 53 performs wireless data communication, such as a wireless LAN (including Wi-Fi) and Bluetooth (registered trademark), over the communication network 10.

An image source apparatus (not shown) that supplies image data can be connected to each of the projectors 11, 13, and 15. The image source apparatus can, for example, be a notebook PC (personal computer), a desktop PC, a tablet terminal, a smartphone, or a PDA (personal digital assistant). The image source apparatus may instead be a video reproducing apparatus, a DVD (digital versatile disk) player, a Blu-ray disk player, a hard disk recorder, a television tuner, a set top box of a CATV (cable television), or a video game console.

The projector 11 acquires image data from an image source and projects images based on the acquired image data via the projection sections 25 and 26 under the control of the control section 21. The image data used by the projector 11 can be selected from image data input from the image source apparatus and image data stored in the storage section 22. An image source of the projection image P1 projected by the projection section 25 and an image source of the projection image P2 projected by the projection section 26 can be separately selected. The image source of the projection image P1 and the image source of the projection image P2 may be different image sources or the same image source. The projector 11 has the function of swapping the image source of the projection image P1 projected by the projection section 25 and the image source of the projection image P2 projected by the projection section 26 based, for example, on a user's operation. The projector 11 can thus interchange the projection images P1 and P2 being projected.

The projector 13 acquires image data from an image source and projects images based on the acquired image data via the projection sections 35 and 36 under the control of the control section 31. The image data used by the projector 13 can be selected from image data input from the image source apparatus and image data stored in the storage section 32. An image source of the projection image P3 projected by the projection section 35 and an image source of the projection image P4 projected by the projection section 36 can be separately selected. The image source of the projection image P3 and the image source of the projection image P4 may be different image sources or the same image source. The projector 13 has the function of swapping the image source of the projection image P3 projected by the projection section 35 and the image source of the projection image P4 projected by the projection section 36 based, for example, on the user's operation. The projector 13 can thus interchange the projection images P3 and P4 being projected.

The projector 15 acquires image data from an image source and projects an image based on the acquired image data via the projection section 55 under the control of the control section 51. The image data used by the projector 15 can be selected from image data input from the image source apparatus and image data stored in the storage section 52.

The projector 11 includes a position detecting section 27, which detects position input operation. The projector 11 allows the user to perform position input operation using a pointing element 201 on a projection area where the projection image P1 is projected.

The pointing element 201 is, for example, a pen-shaped device having a stick-shaped shaft and used by an operator (user) who operates the projector 11 with the pointing element 201 grasped by a hand. The projector 11 detects the position pointed with the front end of the pointing element 201 in a detection area set in the projection area of the projection image P1 as an operation position (pointed position).

The pointing element 201 in the present embodiment is a pen-shaped element and may instead be a stick-shaped pointing element, such as a pointing rod (not shown), or the operator's hand or finger may serve as the pointing element. In the case where the operator's finger serves as the pointing element, for example, a colored or patterned ring or a jig having a shape that covers the operator's finger may be worn around the finger. Still instead, the shape or motion of the operator's finger may be identified by image recognition.

The position detecting section 27 (acceptance section) captures an image of the detection area, extracts an image of the pointing element 201 from the captured image, and determines the positional relationship between the extracted image of the pointing element 201 and the projection area where the projection image P1 is projected to detect the position pointed by the user.

The projector 11 provides, for example, GUI (graphical user interface) operation on the basis of the position detected by the position detecting section 27. Further, the projector 11 carries out a drawing process of drawing a figure or any other object on the basis of the position detected by the position detecting section 27. The projector 11 superimposes the drawn image on the projection image P1 and projects the superimposed image. Specifically, the projector 11 superimposes the drawn image on an image based on image data selected as the image source of the projection image P1 to produce a combined image and projects the combined image as the projection image P1.

The projector 13 includes a position detecting section 37, which detects position input operation. The projector 13 allows the user to perform position input operation using a pointing element 203 on a projection area where the projection image P3 is projected.

The pointing element 203 is, for example, a pen-shaped device having a stick-shaped shaft and used by a user who operates the projector 13 with the pointing element 203 grasped by a hand, as in the case of the pointing element 201. The projector 13 detects the position pointed with the front end of the pointing element 203 in a detection area set in the projection area of the projection image P3 as an operation position (pointed position). The pointing element 203 is not limited to a pen-shaped element and may instead be a stick-shaped pointing element, such as a pointing stick (not shown), or the operator's hand or finger may serve as the pointing element. In the case where the operator's finger serves as the pointing element, for example, a colored or patterned ring or a jig having a shape that covers the operator's finger may be worn around the finger. Still instead, the shape or motion of the operator's finger may be identified by image recognition.

The position detecting section 37 (acceptance section) captures an image of the detection area, extracts an image of the pointing element 203 from the captured image, and determines the positional relationship between the extracted image of the pointing element 203 and the projection area where the projection image P3 is projected to detect the position pointed by the user.

The projector 13 provides, for example, GUI operation on the basis of the position detected by the position detecting section 37. Further, the projector 13 carries out a drawing process of drawing a figure or any other object on the basis of the position detected by the position detecting section 37. The projector 13 superimposes the drawn image on the projection image P3 and project the superimposed image. Specifically, the projector 13 superimposes the drawn image on an image based on image data selected as the image source of the projection image P3 to produce a combined image and projects the combined image as the projection image P3.

In the projection system 1, the projection image P1 or the projection image P2 projected by the projector 11 can be projected by the projector 13 or 15.

For example, to switch the projection image P3 to the projection image P1, the projector 11 transmits control data that instructs projection image switching to the projector 13. The projector 11 subsequently transmits image data selected as the image source of the projection image P1 to the projector 13. The projector 13 receives the image data from the projector 11 and temporarily stores the received image data in the storage section 32. The projector 13 selects the image data temporarily stored in the storage section 32 as the image source of the projection image P3. In a case where the image source of the projection image P1 is a still image, the projector 11 transmits the still image data to the projector 13 once. In a case where the image source of the projection image P1 is motion images (video images), the projector 11 continuously transmits the motion image data to the projector 13. Further, for example, the projector 11 may capture the image source of the projection image P1, produce still image data, and transmit the still image data to the projector 13, and the projector 13 may select the still image data as the image source of the projection image P3 or P4.

Further, in the projection system 1, the projection image P3 or P4 projected by the projector 13 can be projected by the projector 11 or 15.

For example, to switch the projection image P1 to the projection image P3, the projector 13 transmits control data that instructs projection image switching to the projector 11. Instead, the projector 11 may transmit control data that instructs projection image switching to the projector 13 to allow the projector 11 to project the projection image P3 projected by the projector 13. The projector 13 subsequently transmits image data selected as the image source of the projection image P3 to the projector 11. The projector 11 receives the image data from the projector 13 and temporarily stores the received image data in the storage section 22. The projector 13 selects the image data temporarily stored in the storage section 22 as the image source of the projection image P1. In a case where the image source of the projection image P3 is a still image, the projector 13 transmits the still image data to the projector 11 once. In a case where the image source of the projection image P3 is motion images, the projector 13 continuously transmits the motion image data to the projector 11. Further, for example, the projector 13 may capture the image source of the projection image P3, produce still image data, and transmit the still image data to the projector 11, and the projector 11 may select the still image data as the image source of the projection image P1 or P2.

Further, in the projection system 1, a combined image being projected by a projector can be transmitted to another projector. For example, in a case where the projector 11 is projecting a combined image, the projector 11 may transmit data on the combined image to the projector 13 or 15 and cause the projector 13 or 15 to project the combined image. Further, for example, in a case where the projector 13 is projecting a combined image, the projector 13 may transmit data on the combined image to the projector 11 or 15 and cause the projector 11 or 15 to project the combined image.

A combined image projected by any of the projectors 11, 13, and 15 will now be described. A combined image means an image that is a combination of a plurality of images superimposed on each other, and the following three cases are presented by way of example.

A case 1 is a case where the projector 11 or 13 draws an image by using an electronic blackboard function and combines the drawn image with another image. In the case 1, the projector 11 or 13, when it performs the electronic blackboard function, does not select an image source corresponding to an external input but projects a background formed by a circuit system (control system) in the projector 11 or 13. A figure is drawn in accordance with operation of the pointing element 201 in such way that the figure is superimposed on the background. The background is, for example, an all-white screen (entirely white or gray screen) or an all-white screen with ruler lines. The projector 11 or 13 may store a background image template in the storage section 22 or 32 and use the template to project the background. The template may be background image data itself or may be a program or data for producing background image data.

A case 2 is a case where the projector 11 or 13 projects an image from an external image source and further projects a line or a figure drawn with the pointing element 201 and superimposed on the image. In this case, usability that allows a desired object to be added to the image outputted from the external source (image source apparatus) can be achieved. For example, a PC as the image source apparatus inputs an analog signal carrying a presentation material to the projector 11 via an analog RGB cable (not shown). In this example, the user operates the pointing element 201 to draw a bright marking in the presentation material, for example, on a graph and at a portion thereof that the user desires to highlight, and the marking and the presentation material are so projected that the marking is superimposed on the presentation material. In the case 2, a document camera or any other external imaging device may be used as the external source.

A case 3 is a case where a non-electronic diagrammatic picture, such as a map or a large-format teaching material, is presented on any of the flat surfaces PL and the projection screen of any of the projectors 11, 13, and 15 is superimposed on the diagrammatic picture. In the case 3, a diagrammatic picture of an actual object is placed on any of the flat surfaces PL1, PL2, PL3, and other surfaces, and the projection image is superimposed on the diagrammatic picture. Any of the projectors 11, 13, and 15 can therefore perform the action in the case 3. The color or content of the diagrammatic picture of an actual object presented in the case 3 is not limited to a specific color or content, and not only a map in typical colors, a blank map, or any other drawing but a typical document, presentation material, and other pieces of information can be used. Further, in a case where an actual blackboard or white board is installed on any of the flat surfaces PL1, PL2, PL3, and other surfaces, the combined image in the case 3 may include a projection image superimposed on a figure, a sentence, a picture, or any other object drawn on the blackboard or the white board. A non-electronic diagrammatic picture of an actual object presented in the case 3 is imaged by an imaging section 28 or 38. The imaging section 28 is an imaging section that images the portion within a viewing angle different from that of an imaging section 273 (FIG. 4), which detects the position of the pointing element 201. The imaging section 28 images the portion within a viewing angle containing a projection image projected by the projection section 25 and/or the projection section 26. The imaging section 38 provided in the projector 13 is the same as the imaging section 28 of the projector 11. That is, the imaging section 38 is an imaging section that images the portion within a viewing angle different from that of an imaging section 373 (FIG. 6), which detects the position of a pointing element 302. In more detail, the imaging section 38 is an imaging section that images the portion within a viewing angle containing a projection image projected by the projection section 35 and/or the projection section 36.

For example, consider a case where the imaging section 28 images the flat surface PL1, a diagrammatic picture of an actual object is placed on the flat surface PL1, and the projector 11 projects the projection image P1 on the diagrammatic picture. An image captured with the imaging section 28 contains the projection image P1 superimposed on the diagrammatic picture of the actual object. That is, image data on the state in which the projection image P1 is superimposed on the diagrammatic picture of the actual object can be produced. Similarly, for example, consider a case where the imaging section 38 images the flat surface PL2, a diagrammatic picture of an actual object is placed on the flat surface PL2, and the projector 13 projects the projection image P3 on the diagrammatic picture. An image captured with the imaging section 38 contains the projection image P3 superimposed on the diagrammatic picture of the actual object. That is, image data on the state in which the projection image P3 is superimposed on the diagrammatic picture of the actual object can be produced.

As described with reference to the cases 1, 2, and 3, the projectors 11, 13, and 15, which form the projection system 1, can not only project a single image but show the user a combined image that is the combination of a plurality of images.

In a case where the projector 11 performs the action in the case 1 to project a combined image, the image data is stored in a storage area of the control system (DRAM 225 (FIG. 4), for example) of the projector 11. The DRAM 225 separately stores the background image data and data on the line and figure drawn by operation of the pointing element 201. Specifically, data on the background and data on each of the line and the figure (called constituent parts) drawn by the pointing element 201 is stored in the form of vector data or raster image data. Image data on the combined image that is the combination of the sets of data described above is formed in a frame memory 241 (FIG. 4). In the case 1, to extract the image data on the combined image from the projector 11, there is a method for extracting component data on the constituent parts stored in the DRAM 225. To transmit the data from the projector 11 to another projector (projector 13, for example) in accordance with the method, the component data on the constituent parts stored in the DRAM 225 may be transmitted to the projector 13, and the projector 13 may reconfigure the image data on the combined image in a frame memory 341. It is instead conceivable to employ a method in which the projector 11 may capture the data on the combined image in the frame memory 241 and transmit the captured data as image data to the projector 13. The same holds true for a case where the projector 13 projects a combined image.

In the case 2, externally input image data or image data that is an externally input analog signal having undergone digital conversion is stored in the storage area of the control system (DRAM 225, for example) of the projector 11. The DRAM 225 separately stores the image data from an external source and the data on the line and figure drawn by operation of the pointing element 201. Image data on a combined image that is the combination of the image data and the line/figure data is formed in the frame memory 241. When the image data from the external source has changed and the image data on the combined image in the frame memory 241 is changed accordingly, for example, the changed image data may be stored in another storage area of the frame memory 241. The image data on the combined image before the change held in the frame memory 241 allows restoration of the projection image before the change.

In the case 2, to extract the image data on the combined image from the projector 11, there is a method for extracting component data on the constituent parts stored in the DRAM 225. To transmit the data from the projector 11 to another projector (projector 13, for example) in accordance with the method, the component data on the constituent parts stored in the DRAM 225 and the image data that forms the background are transmitted to the projector 13. The projector 13 may then reconfigure the image data on the combined image in the frame memory 341. It is instead conceivable to employ a method for capturing the data on the combined image in the frame memory 241 and transmitting the captured data as image data to the projector 13. The same holds true for the case where the projector 13 projects a combined image.

A combined image projected in the case 3 is an image that is the combination of an actual object and a projection image. In the projection system 1, when a projector projects a combined image in the case 3, the combined image can be transmitted to another projector.

That is, when the projector 11 projects a combined image in the case 3, the projector 11 causes the imaging section 28 to image the actual object, which forms the base on which the projection image is superimposed. In this case, it is more preferable that only at the instant of the imaging, the projector 11 causes the projection section 25 or 26 to stop projecting light or blocks the light projected by the projection section 25 or 26 so that only the base is imaged. The projector 11 captures data representing the image so projected as to be superimposed on the base from the frame memory 241. The projector 11 may then transmit the data representing the image captured with the imaging section 28 and the data captured from the frame memory 241 as data on the combined image to another projector, such as the projector 13 or 15.

In the projection system 1, any of the projectors 11, 13, and 15 can be set as the apparatus that transmits the control data that instructs the projection image switching. It can be said that the thus set apparatus is a primary-control-side projector. For example, in a case where the projector 11 is set as the primary-control-side projector, the projector 11 transmits the control data to control the image switching between the projectors 11 and 13, between the projectors 11 and 15, and between the projectors 13 and 15. Further, in this case, the projector 11 may be configured to control swapping of the projection images P3 and P4 projected by the projector 13 by transmitting the control data to the projector 13.

The aspect of the projection image swapping is not limited to the case where a projection image projected by a projector is projected by another projector and may be an aspect in which two projection images are swapped. For example, to swap the projection image P1 and the projection image P3, the projector 11 transmits image data selected as the image source of the projection image P1 to the projector 13. The projector 13 transmits image data selected as the image source of the projection image P3 to the projector 11. The projectors 11 and 13 each select the received image data as the image source.

In the cases 1, 2, and 3 described above, to cause a combined image transmitted by the projector 11 to another projector, the projector 13 or 15, to be projected via the projection section 25 again, the projector 11 may re-acquire the image data on the combined image from the projector 13 or 15. That is, the projector 13 or 15 may transmit the image data to the projector 11. Instead, the projector 11 may store the image data to be transmitted to another projector, the projector 13 or 15, in the storage section 22 when the projector 11 transmits the image data, and the projector 11 may reuse and project the image data stored in the storage section 22.

Further, in the case 3, to cause a combined image that the projector 11 projects via the projection section 26 or transmits to another projector, the projector 13 or 15, to be projected via the projection section 25 again, the projection section 25 may be configured to project image data containing no image data captured by the imaging section 28. Instead, image data containing the image data captured by the imaging section 28 may be projected so that the combined image can be reproduced even after the actual object, which forms the base, is removed. Still instead, either of the two types of image data may be selected and projected.

The configurations of the projectors 11, 13, and 15, which form the projection system 1, will subsequently be described in detail.

Figure 4:
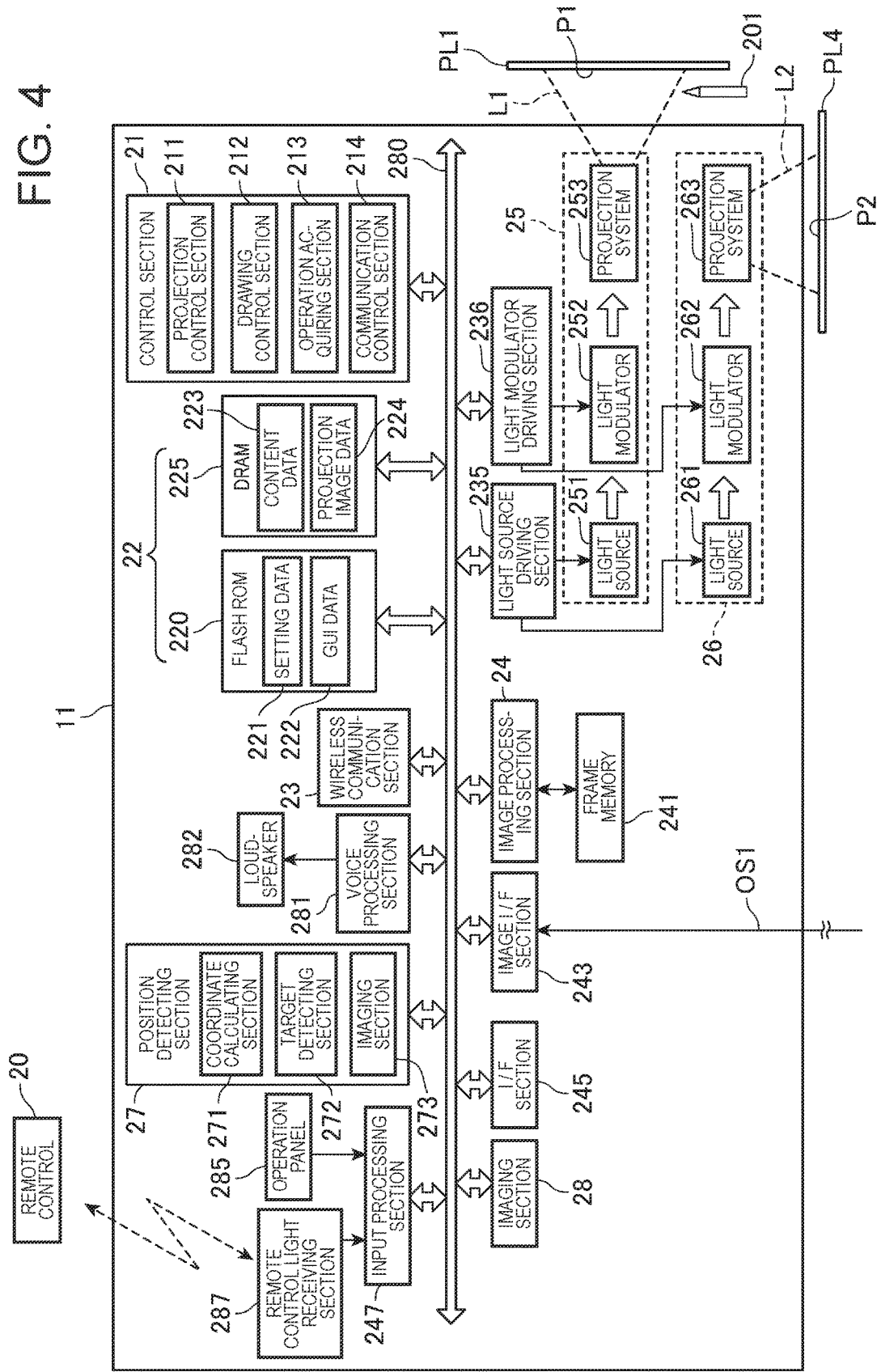
FIG. 4 is a block diagram of a projector.

FIG. 4 is a block diagram of the projector 11.

The projector 11 includes the control section 21, the storage section 22, the wireless communication section 23, the image processing section 24, the projection sections 25 and 26, and the position detecting section 27, as described above. The projector 11 further includes a light source driving section 235, a light modulator driving section 236, an image interface (I/F) section 243, an interface section 245, an input processing section 247, and a voice processing section 281. The sections described above are connected to each other via a bus 280. Further, the frame memory 241 is connected to the image processing section 24, and an operation panel 285 and a remote control light receiving section 287 are connected to the input processing section 247, as will be described later. A loudspeaker 282 is connected to the voice processing section 281.

The image interface section 243 (first acquisition section, second acquisition section) is an interface that connects the image source apparatus described above to the projector 11 and includes a connector, an interface circuit, and other components. The image interface section 243 may include a connector to which a card-shaped recording medium, such as an SD (secure digital) memory card, a USB memory device, or any other portable storage medium can be connected, and an interface circuit.

The image interface section 243 is not limited to the configuration in which it is wired to the image source apparatus. For example, the image interface section 243 may be configured to perform wireless data communication that complies with a wireless LAN (including Wi-Fi), Miracast (registered trademark), Bluetooth (registered trademark), or any other standard with the image source apparatus.

Digital image data in a data format that can be processed by the projector 11 is input to the image interface section 243. The digital image data may be still image data or motion image data. In the following description, data input from the image source apparatus to the image interface section 243 is called input image data OS1.

The image interface section 243 is not limited to an interface to which digital image data can be input and may, for example, have a configuration to which an analog image (video) signal can be input. In this case, the input image data OS1 may be an analog signal. In this case, the image interface section 243 may have the function of converting an analog signal into digital data.

The interface section 245 is connected to an external apparatus, such as a PC, and transmits and receives a variety of data, such as the control data, to and from the external apparatus. For example, the interface section 245 performs data communication that complies with Ethernet (registered trademark), IEEE 1394, USB (universal serial bus), or any other standard.

The projection section 25 includes a light source 251, a light modulator 252, which modulates light emitted from the light source 251 to produce image light, and a projection system 253, which projects the modulated image light from the light modulator 252 to form a projection image.

The projection section 26 includes a light source 261, a light modulator 262, which modulates light emitted from the light source 261 to produce image light, and a projection system 263, which projects the modulated image light from the light modulator 262 to form a projection image.

The light sources 251 and 261 are each formed of a halogen lamp, a xenon lamp, an ultrahigh-pressure mercury lamp, or any other lamp or an LED, a laser light source, or any other solid-state light source. The light sources 251 and 261 are each turned on by using electric power supplied from the light source driving section 235 and emit light toward the light modulators 252 and 262, respectively. The light sources 251 and 261 do not necessarily have the same configuration. For example, the light source 251 may be formed of an ultrahigh-pressure mercury lamp, and the light source 261 may be formed of a solid-state light source.

The light source driving section 235 can turn on and off the light sources 251 and 261 individually. The light source driving section 235 may be configured to adjust the luminance of the light emitted from the light sources 251 and 261 individually under the control of the control section 21.

The light modulator 252 modulates the light emitted from the light source 251 to produce image light and irradiates the projection system 253 with the image light. The light modulator 262 modulates the light emitted from the light source 261 to produce image light and irradiates the projection system 263 with the image light.

The light modulators 252 and 262 each include, for example, a transmissive liquid crystal light valve, a reflective liquid crystal light valve, a digital mirror device (DMD), or any other light modulating element. The light modulators 252 and 262 do not necessarily have the same configuration. For example, the light modulator 252 may be formed of a transmissive liquid crystal light valve, and the light modulator 262 may be formed of a reflective liquid crystal light valve. The light modulator driving section 236 is connected to the light modulating elements of the light modulators 252 and 262. The light modulator driving section 236 drives the light modulators 252 and 262 on the basis of image signals outputted from the image processing section 24. The light modulator driving section 236 can separately drive the light modulators 252 and 262 under the control of the control section 21. The light modulator driving section 236 drives the light modulating element of each of the light modulators 252 and 262 to set the grayscale of each pixel so that an image is drawn on a frame (screen) basis in the light modulating element.

The projector 11 has a configuration in which the single light modulator driving section 236 drives the light modulators 252 and 262 as an example of the configuration in which the single projector 11 can project a plurality of projection images P1 and P2. The above configuration is only one example, and, for example, the projector 11 may instead include two light modulator driving sections 236; one of the light modulator driving sections 236 may drive the light modulator 252, and the other light modulator driving section 236 may drive the light modulator 262.

The image processing section 24 inputs an image signal representing an image to be drawn in the light modulator 252 and an image signal representing an image to be drawn in the light modulator 262 to the light modulator driving section 236. Specifically, a plurality of signal lines via which the image processing section 24 inputs the image signals to the light modulator driving section 236 may be provided. Instead, the image processing section 24 may input the image signal representing an image to be drawn in the light modulator 252 and the image signal representing an image to be drawn in the light modulator 262 in a time division manner to the light modulator driving section 236.

The projection system 253 includes a lens and a mirror that focus the light modulated by the light modulator 252 on a screen. The projection system 253 may further include a zoom lens, a focus lens, and a variety of other lenses or lens groups. The projection system 263 similarly includes a lens and a mirror that focus the light modulated by the light modulator 262 on a screen and may further include a zoom lens, a focus lens, and a variety of other lenses or lens groups. In the present embodiment, the projection system 253 is so disposed as to face the flat surface PL1, and the projection system 263 is so disposed as to face the flat surface PL4. The projection section 25 projects the image light L1 toward the flat surface PL1 to project the projection image P1, and the projection section 26 projects the image light L2 toward the flat surface PL4 to project the projection image P2. The image light L1 and the image light L2 are projected in directions in which the image light L1 and the image light L2 do not overlap with each other. The image light L1 and the image light L2 do not overlap with each other at least unless the distance from the projector 11 is greater than the distance over which the image light L1 travels to the flat surface PL1 or the distance over which the image light L2 travels to the flat surface PL4.

The position detecting section 27 includes an imaging section 273, a target detecting section 272, and a coordinate calculating section 271. The imaging section 273 is a digital camera that images a range containing the detection area where operation of the pointing element 201 can be detected, and the imaging section 273 produces captured image data. The imaging range, that is, the viewing angle of the imaging section 273 covers at least the detection area. The imaging section 273 is not limited to a camera that images visible light and may be a camera that images infrared light.

The target detecting section 272 detects an image of the pointing element 201 from the image data captured by the imaging section 273. That is, the target detecting section 272 analyzes the image data captured by the imaging section 273 to detect an image of the pointing element 201 from the captured image. In a case where the captured image contains an image of the pointing element 201, the target detecting section 272 identifies the position of the front end of the pointing element 201 in the image thereof as the operation position. The target detecting section 272 determines the coordinates representing the position of the front end of the pointing element 201 in the captured image.

The coordinate calculating section 271 converts the coordinates of the position of the front end of the pointing element 201 that have been detected and identified by the target detecting section 272 from the captured image into the coordinates in the detection area, where operation of the pointing element 201 is detected. The coordinate calculating section 271 outputs the calculated coordinates as coordinate data on a pointed position in the detection area to the control section 21.

The input processing section 247 (acceptance section) accepts the user's operation.

The input processing section 247 detects operation performed on the operation panel 285. The operation panel 285 is disposed, for example, on the enclosure of the projector 11 and includes a variety of switches. The input processing section 247 detects operation performed on any of the switches on the operation panel 285 and outputs control data representing the operated switch to the control section 21.

The remote control light receiving section 287, which is connected to the input processing section 247, receives an infrared signal transmitted from a remote control 20 and decodes the received signal. The remote control 20 includes a variety of switches and transmits an infrared signal representing an operated switch. The remote control light receiving section 287 decodes the received signal and outputs data on the decoded signal to the input processing section 247. The input processing section 247 outputs the data input from the remote control light receiving section 287 to the control section 21.

The control section 21 (switching control section, first control section) is, for example, a processor including a CPU (central processing unit), a flash ROM, and a RAM (random access memory) that are not shown. The control section 21, in which the CPU executes a program stored in the flash ROM or the storage section 22, controls each portion of the projector 11. The control section 21 includes a projection control section 211, a drawing control section 212, an operation acquiring section 213, and a communication control section 214 as functional blocks that control the portions of the projector 11. The functional blocks are achieved by cooperation between software and hardware when the CPU of the control section 21 executes the program.

The projection control section 211 controls the image processing section 24, the light source driving section 235, the light modulator driving section 236, and other portions to control the projection of the projection images P1 and P2 performed by the projector 11. The projection control section 211 controls the timing when a process carried out by the image processing section 24 is carried out, a condition under which the process is carried out, and other factors associated with the process. The projection control section 211 further controls the light source driving section 235 to, for example, adjust the luminance of the light emitted from the light sources 251 and 261.

The projection control section 211 selects an image source of the projection image P1 and an image source of the projection image P2 on the basis of the user's operation acquired by the operation acquiring section 213. The projection control section 211 controls the image processing section 24 to cause it to acquire image data from each of the selected image sources.

The projection control section 211 further performs projection image switching control in which the projection image P1 or P2 is switched to the projection image P3 or P4 projected by the projector 13. In this case, the projection control section 211 changes the image source of the projection image P1 or P2 to the image data transmitted from the projector 13 and temporarily stored in the storage section 22.

The projection control section 211 further causes the projector 13 or 15 to project the projection image P1 or P2. In this case, the projection control section 211 produces control data that controls the projector 13 or 15 and transmits the control data under the control of the communication control section 214. The projection control section 211 further transmits the image data on the projection image P1 or P2 or combined image data stored in the storage section 22 under the control of the communication control section 214.

The projection control section 211 further controls the imaging section 28 to cause it to perform imaging to acquire captured image data. The projection control section 211 may perform projection by using the acquired captured image data as the image source. The projection control section 211 may instead temporarily store the captured image data from the imaging section 28 in the DRAM 225 and, for example, transmit the captured image data to another projector.

The drawing control section 212 draws a figure (including straight line, curved line, geometric figure, and other objects), an image, a letter, and any other symbol on the basis of the coordinates of the pointed position detected by the position detecting section 27. The drawing control section 212 produces image data on a figure corresponding to the coordinates of pointed positions detected by the position detecting section 27 or the trajectory of the coordinates and causes the image processing section 24 to combine the produced image data with an image drawn in the frame memory 241. The image processing section 24 may instead carry out the process of producing the image data on the figure.

The operation acquiring section 213 detects operation performed on the projector 11. The operation acquiring section 213 detects operation performed via the remote control 20 and the operation panel 285, which function as input devices, on the basis of data input from the input processing section 247.

In a state in which the image processing section 24 and the projection section 25 project an image for GUI operation on the basis of GUI data 222, the operation acquiring section 213 acquires the position pointed with the pointing element 201 from the position detecting section 27 to identify the content of GUI operation. The image for GUI operation is, for example, a menu bar 206 (FIG. 7), which will be described later. In a case where operation of the pointing element 201 is detected and the position pointed with the pointing element 201 falls within the menu bar 206, the operation acquiring section 213 identifies an icon specified in the menu bar 206 and determines the content of the operation.

The storage section 22 is a storage device that stores data processed by the control section 21 and the program executed by the CPU of the control section 21. The storage section 22 can be configured to include a variety of volatile storage devices and/or nonvolatile storage devices. In the present embodiment, the storage section 22 includes a flash ROM 220 and the DRAM (dynamic RAM) 225. The flash ROM 220 is advantageous in that it is a rewritable nonvolatile storage device, and the DRAM 225 is advantageous in that the access speed thereof is faster than that of the flash ROM 220. The flash ROM 220 is formed of a nonvolatile semiconductor storage element and stores setting data 221 and the GUI data 222. The DRAM 225 stores content data 223 and projection image data 224. The control section 21 and other functional sections can therefore read the content data 223 and the projection image data 224 at high speed. When the projector 11 is powered off, the content data 223 and the projection image data 224 may be saved in the flash ROM 220. The DRAM 225 may be replaced with a nonvolatile memory.

The setting data 221 contains a variety of setting values (parameters) that specify actions of the projector 11. The setting data 221 contains, for example, setting values that allow the projector 11 to perform wireless data communication over the communication network 10. Specifically, the setting data 211 may contain identification information, such as the network addresses and the IDs of the projectors 11, 13, and 15 and the wireless communication apparatus 9, and authentication information, such as pass phrases thereof. The setting data 221 may further contain data that specifies the type or content of image processing performed by the image processing section 24 and parameters used in the image processing.

The GUI data 222 (image data for operation) contains data for operation of the projector 11 via a GUI. The projector 11, which projects the image for operation via the projection section 25 and detects operation performed on the projected image, allows operation via the GUI. The GUI data 222 contains image data on the GUI-forming image for operation and data for detecting operation performed on the image data.

The content data 223 contains still image data or motion image data that can be selected as an image source. The content data 223 may contain voice data.

The projection image data 224 contains image data on an image projected by the projector 11 via the projection section 25 or 26. For example, to capture the projection image under the control of the control section 21, the image processing section 24 acquires the image data representing the image drawn in the frame memory 241 and stores the image data as the projection image data 224. In a case where the projector 11 receives image data on a projection image from the projector 13 or 15, the received image data is stored as the projection image data 224. In a case where the drawing control section 212 draws an image in accordance with operation of the pointing element 201, and the image processing section 24 produces a combined image containing the drawn image, followed by projection of the combined image via the projection section 25, image data on the projected combined image is temporarily stored as the projection image data 224.

The frame memory 241 is connected to the image processing section 24.

The image processing section 24 acquires image data from an image source selected under the control of the control section 21 and performs a variety of types of image processing on the acquired image data. For example, the image processing section 24 carries out a resolution conversion process of converting the resolution of the image data in accordance with the display resolution of the light modulators 252 and 262. The image processing section 24 further carries out a geometric correction process of correcting the shape of the image, a color tone correction process of correcting the color tone of the image data, and other processes. The image processing section 24 can further perform image processing that rotates the orientation of an image projected by the projection section 26 by 180 degrees under the control of the control section 21. The image processing section 24 produces an image signal for displaying the processed image data and outputs the image signal to the light modulator driving section 236.

To perform image processing, the image processing section 24 (image producing section) develops an image based on image data acquired from an image source in the frame memory 241 and performs a variety of types of processing on the image developed in the frame memory 241. For example, the image processing section 24 superimposes an image drawn by operation of the pointing element 201 on the image in the frame memory 241 so that the two images are combined with each other to produce a combined image (superimposed image) under the control of the drawing control section 212. To display an image for GUI operation, such as the menu bar 206 (FIG. 7), the image processing section 24 superimposes an image based on the GUI data 222 on the image in the frame memory 241 so that the two images are combined with each other to produce a combined image. The image processing section 24 may output image data on the combined image combined in the frame memory 241 to the storage section 22 and cause the storage section 22 to store the image data as the projection image data 224. In a case where the projection control section 211 instructs the image processing section 24 to capture the projection image, the image processing section 24 may output the image data in the frame memory 241 to the storage section 22 and cause the storage section 22 to store the image data as the projection image data 224.

In the present embodiment, the single image processing section 24 processes the projection image P1 and the projection image P2. In this case, the frame memory 241 may be configured to have an area where an image to be projected by the projection section 25 is developed and an area where an image to be projected by the projection section 26 is developed.

The light source driving section 235 supplies each of the light sources 251 and 252 with drive current and pulses to cause the light sources 251 and 252 to emit light. The light source driving section 235 may be capable of adjusting the luminance of the light emitted from the light sources 251 and 252. The light modulator driving section 236 drives the light modulators 252 and 262 on the basis of image signals input from the image processing section 24 to draw images in the light modulators 252 and 262 on a frame basis under the control of the control section 21.

The voice processing section 281 outputs voice via the loudspeaker 282 on the basis of input digital voice data or an input analog voice signal under the control of the control section 21.

Figure 5:
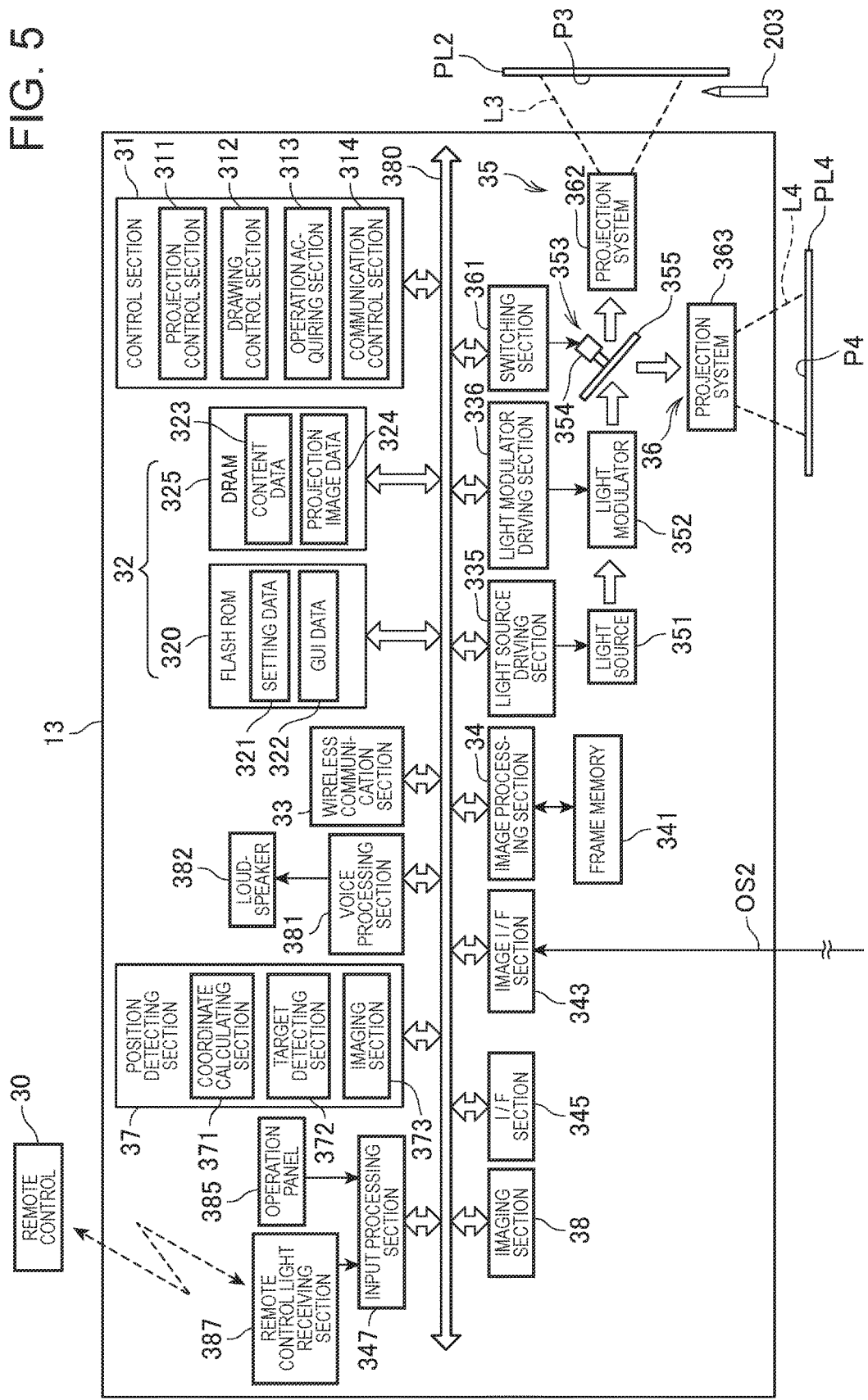
FIG. 5 is a block diagram of a projector.

FIG. 5 is a block diagram of the projector 13.

The projector 13 includes the control section 31, the storage section 32, the wireless communication section 33, the image processing section 34, the projection sections 35 and 36, and the position detecting section 37, as described above. The projector 13 further includes a light source driving section 335, a light modulator driving section 336, an image interface section 343, an interface section 345, an input processing section 347, a switching section 361, and a voice processing section 381. The sections described above are connected to each other via a bus 380. Further, the frame memory 341 is connected to the image processing section 34, and an operation panel 385 and a remote control light receiving section 387 are connected to the input processing section 347, as will be described later. A loudspeaker 382 is connected to the voice processing section 381.

The image interface section 343 (first acquisition section, second acquisition section) is an interface that connects the image source apparatus described above to the projector 13 and includes a connector, an interface circuit, and other components. The image interface section 343 may include a connector to which a card-shaped recording medium, such as an SD memory card, a USB memory device, or any other portable storage medium can be connected, and an interface circuit.

The image interface section 343 is not limited to the configuration in which it is wired to the image source apparatus. For example, the image interface section 343 may be configured to perform wireless data communication that complies with a wireless LAN (including Wi-Fi), Miracast (registered trademark), Bluetooth (registered trademark), or any other standard with the image source apparatus.

Digital image data in a data format that can be processed by the projector 13 is input to the image interface section 343. The digital image data may be still image data or motion image data. In the following description, data input from the image source apparatus to the image interface section 343 is called input image data OS2.

The image interface section 343 is not limited to an interface to which digital image data can be input and may, for example, have a configuration to which an analog image (video) signal can be input. In this case, the input image data OS2 may be an analog signal. In this case, the image interface section 343 may have the function of converting an analog signal into digital data.

The interface section 345 is connected to an external apparatus, such as a PC, and transmits and receives a variety of data, such as the control data, to and from the external apparatus. For example, the interface section 345 performs data communication that complies with Ethernet, IEEE 1394, USB, or any other standard.

The projector 13 includes alight source 351, alight modulator 352, which modulates light emitted from the light source 351 to produce image light, projection systems 362 and 363, and a direction switching section 353, which switches the path of the modulated image light from the light modulator 352 to another and guides the image light along the switched path. That is, the projector 13 has a configuration in which the direction switching section 353 guises the image light to the two projection systems 362 and 363 as an example of the configuration in which the single projector 13 can project a plurality of projection images P3 and P4.

The direction switching section 353 can switch a state in which the modulated image light from the light modulator 352 is guided to the projection system 362 and projected on the flat surface PL2 to a state in which the modulated image light from the light modulator 352 is guided to the projection system 363 and projected on the flat surface PL4 and vice versa. In the configuration described above, the projection system. 362 forms the projection section 35, and the projection system 363 forms the projection section 36.

The timing when the state in which the direction switching section 353 guides the image light to the projection system 362 is switched to the state in which the direction switching section 353 guides the image light to the projection system 363 and vice versa can be controlled by the control section 21. The control section 21 changes the image drawn in the light modulator 352 in synchronization with the timing when the direction switching section 353 performs the switching to allow the projector 13 to project different images via the projection systems 362 and 363. That is, the projector 13, which is configured to use the single light modulator 352, can project two different projection images in different directions.

In the present embodiment, the projection system 362 is so disposed as to face the flat surface PL2, and the projection system 363 is so disposed as to face the flat surface PL4. The projection section 35 projects the image light L3 toward the flat surface PL3 to project the projection image P3, and the projection section 36 projects the image light L4 toward the flat surface PL4 to project the projection image P4. The image light L3 and the image light L4 are projected in directions in which the image light L3 and the image light L4 do not overlap with each other. The image light L3 and the image light L4 do not overlap with each other at least unless the distance from the projector 13 is greater than the distance over which the image light L3 travels to the flat surface PL2 or the distance over which the image light L4 travels to the flat surface PL4.

The light source 351 is formed of a halogen lamp, a xenon lamp, an ultrahigh-pressure mercury lamp, or any other lamp or an LED, a laser light source, or any other solid-state light source. The light source 351 is turned on by using electric power supplied from the light source driving section 335 and emits light toward the light modulator 352.

The light modulator 352 modulates the light emitted from the light source 351 to produce image light and irradiates the projection systems 362 and 363 with the image light.

The light modulator 352 includes, for example, a transmissive liquid crystal light valve, a reflective liquid crystal light valve, a digital mirror device, or any other light modulating element. The light modulator driving section 336 is connected to the light modulating element of the light modulator 352. The light modulator driving section 336 drives the light modulator 352 on the basis of an image signal outputted from the image processing section 34. The light modulator driving section 336 drives the light modulating element of the light modulator 352 to set the grayscale of each pixel so that an image is drawn on a frame (screen) basis in the light modulating element.

The projection system 362 includes a lens and a mirror that focus the light modulated by the light modulator 352 on a screen. The projection system 362 may further include a zoom lens, a focus lens, and a variety of other lenses or lens groups. The projection system 363 similarly includes a lens and a mirror that focus the light modulated by the light modulator 352 on a screen and may further include a zoom lens, a focus lens, and a variety of other lenses or lens groups.

The position detecting section 37 includes a coordinate calculating section 371, a target detecting section 372, and an imaging section 373. The imaging section 373 is a digital camera that images a range containing the detection area where operation of the pointing element 203 can be detected, and the imaging section 373 produces captured image data. The imaging range, that is, the viewing angle of the imaging section 373 covers at least the detection area. The imaging section 373 is not limited to a camera that images visible light and may be a camera that images infrared light.

The target detecting section 372 detects an image of the pointing element 203 from the image data captured by the imaging section 373. That is, the target detecting section 372 analyzes the image data captured by the imaging section 373 to detect an image of the pointing element 203 from the captured image. In a case where the captured image contains an image of the pointing element 203, the target detecting section 372 identifies the position of the front end of the pointing element 203 in the image thereof as the operation position. The target detecting section 372 determines the coordinates representing the position of the front end of the pointing element 203 in the captured image.

The coordinate calculating section 371 converts the coordinates of the position of the front end of the pointing element 203 that have been detected and identified by the target detecting section 372 from the captured image into the coordinates in the detection area, where operation of the pointing element 203 is detected. The coordinate calculating section 371 outputs the calculated coordinates as coordinate data on a pointed position in the detection area to the control section 31.

The input processing section 347 (acceptance section) accepts the user's operation.

The input processing section 347 detects operation performed on the operation panel 385. The operation panel 385 is disposed, for example, on the enclosure of the projector 13 and includes a variety of switches. The input processing section 347 detects operation performed on any of the switches on the operation panel 385 and outputs control data representing the operated switch to the control section 31.

The remote control light receiving section 387, which is connected to the input processing section 347, receives an infrared signal transmitted from a remote control 30 and decodes the received signal. The remote control 30 includes a variety of switches and transmits an infrared signal representing an operated switch. The remote control light receiving section 387 decodes the received signal and outputs data on the decoded signal to the input processing section 347. The input processing section 347 outputs the data input from the remote control light receiving section 387 to the control section 31.

The control section 31 (switching control section, first control section) includes, for example, a CPU, a flash ROM, and a RAM that are not shown. The control section 31, in which the CPU executes a program stored in the flash ROM or the storage section 32, controls each portion of the projector 13. The control section 31 includes a projection control section 311, a drawing control section 312, an operation acquiring section 313, and a communication control section 314 as functional blocks that control the portions of the projector 13. The functional blocks are achieved by cooperation between software and hardware when the CPU of the control section 31 executes the program.

The projection control section 311 controls the image processing section 34, the light source driving section 335, the light modulator driving section 336, and other portions to control the projection of the projection images P3 and P4 performed by the projector 13. The projection control section 311 controls the timing when a process carried out by the image processing section 34 is carried out, a condition under which the process is carried out, and other factors associated with the process. The projection control section 311 further controls the light source driving section 335 to, for example, adjust the luminance of the light emitted from the light source 351.

The projection control section 311 selects an image source of the projection image P3 and an image source of the projection image P4 on the basis of the user's operation acquired by the operation acquiring section 313. The projection control section 311 controls the image processing section 34 to cause it to acquire image data from each of the selected image sources.

The projection control section 311 further performs projection image switching control in which the projection image P3 or P4 is switched to the projection image P1 or P2 projected by the projector 11. In this case, the projection control section 311 changes the image source of the projection image P3 or P4 to the image data transmitted from the projector 11 and temporarily stored in the storage section 32.

The projection control section 311 further causes the projector 11 or 15 to project the projection image P3 or P4. In this case, the projection control section 311 produces control data that controls the projector 11 or 15 and transmits the control data under the control of the communication control section 314. The projection control section 311 further transmits the image data on the projection image P3 or P4 or combined image data stored in the storage section 32 under the control of the communication control section 314.

The projection control section 311 further controls the imaging section 38 to cause it to perform imaging to acquire captured image data. The projection control section 311 may perform projection by using the acquired captured image data as the image source. The projection control section 311 may instead temporarily store the captured image data from the imaging section 38 in a DRAM 325 and, for example, transmit the captured image data to another projector.

The drawing control section 312 draws a figure (including straight line, curved line, geometric figure, and other objects), an image, a letter, and any other symbol on the basis of the coordinates of the pointed position detected by the position detecting section 37. The drawing control section 312 produces image data on a figure corresponding to the coordinates of pointed positions detected by the position detecting section 37 or the tracing of the coordinates and causes the image processing section 34 to combine the produced image data with an image drawn in the frame memory 341. The image processing section 34 may instead carry out the process of producing the image data on the figure.

The operation acquiring section 313 detects operation performed on the projector 13. The operation acquiring section 313 detects operation performed via the remote control 30 and the operation panel 385, which function as input devices, on the basis of data input from the input processing section 347.

Figure 7:
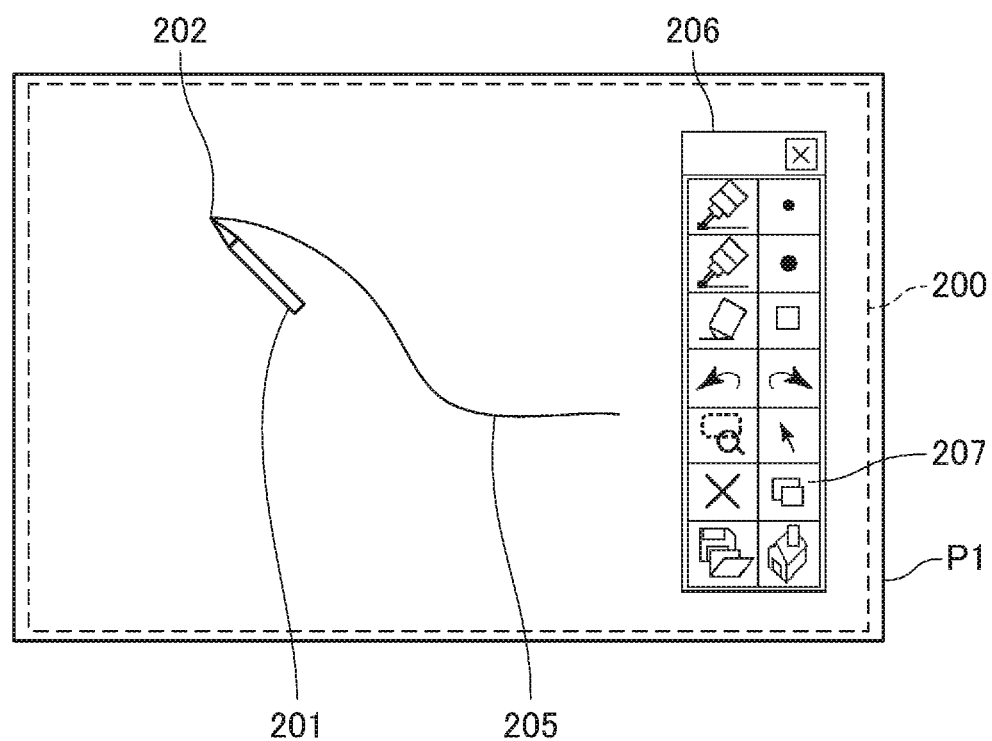
FIG. 7 shows an aspect of GUI operation.

In a state in which the projection section 35 (projection system 362) projects an image for GUI operation on the basis of GUI data 322, the operation acquiring section 313 acquires the position pointed with the pointing element 203 from the position detecting section 37 to identify the content of GUI operation. The image for GUI operation is, for example, the menu bar 206 (FIG. 7). In a case where the position pointed with the pointing element 203 falls within the image for GUI operation, the operation acquiring section 313 identifies an icon or any other object specified in the image for GUI operation and determines the content of the operation.

The storage section 32 is a storage device that stores data processed by the control section 31 and the program executed by the CPU of the control section 31. The storage section 32 can be configured to include a variety of volatile storage devices and/or nonvolatile storage devices. In the present embodiment, the storage section 32 includes a flash ROM 320 and the DRAM 325. The flash ROM 320 is configured in the same manner as the flash ROM 220, and the DRAM 325 is configured in the same manner as the DRAM 225. The flash ROM 320 stores setting data 321 and the GUI data 322, and the DRAM 325 stores content data 323 and projection image data 324. When the projector 13 is powered off, the content data 323 and the projection image data 324 may be saved in the flash ROM 320.

The setting data 321 contains a variety of setting values (parameters) that specify actions of the projector 13. The setting data 321 contains, for example, setting values that allow the projector 13 to perform wireless data communication over the communication network 10. Specifically, the setting data 311 contains identification information, such as the network addresses and the IDs of the projectors 11, 13, and and the wireless communication apparatus 9, and authentication information, such as pass phrases thereof. The setting data 321 may further contain data that specifies the type or content of image processing performed by the image processing section 34 and parameters used in the image processing.

The GUI data 322 (image data for operation) contains data for operation of the projector 13 via a GUI. The projector 13, which projects the image for operation via the projection section 35 and detects operation performed on the projected image, allows operation via the GUI. The GUI data 322 contains image data on the GUI-forming image for operation and data for detecting operation performed on the image data.

The content data 323 contains still image data or motion image data that can be selected as an image source. The content data 323 may contain voice data.

The projection image data 324 contains image data on an image projected by the projector 13 via the projection section 35 or 36. For example, to capture the projection image under the control of the control section 31, the image processing section 34 acquires the image data representing the image drawn in the frame memory 341 and stores the image data as the projection image data 324. In a case where the projector 13 receives image data on a projection image from the projector 11 or 15, the received image data is stored as the projection image data 324. In a case where the drawing control section 312 draws an image in accordance with operation of the pointing element 203, and the image processing section 34 produces a combined image containing the drawn image, followed by projection of the combined image via the projection section 35, image data on the projected combined image is temporarily stored as the projection image data 324.

The frame memory 341 is connected to the image processing section 34.

The image processing section 34 acquires image data from an image source selected under the control of the control section 31 and performs a variety of types of image processing on the acquired image data. For example, the image processing section 34 carries out a resolution conversion process of converting the resolution of the image data in accordance with the display resolution of the light modulator 352. The image processing section 34 further carries out a geometric correction process of correcting the shape of the image, a color tone correction process of correcting the color tone of the image data, and other processes. The image processing section 34 can further perform image processing that rotates the orientation of an image projected by the projection section 36 by 180 degrees under the control of the control section 31. The image processing section 34 produces an image signal for displaying the processed image data and outputs the image signal to the light modulator driving section 336.

To perform image processing, the image processing section 34 (image producing section) develops an image based on image data acquired from an image source in the frame memory 341 and performs a variety of types of processing on the image developed in the frame memory 341. For example, the image processing section 34 superimposes an image drawn by operation of the pointing element 203 on the image in the frame memory 341 so that the two images are combined with each other to produce a combined image (superimposed image) under the control of the drawing control section 312. To display an image for GUI operation, the image processing section 34 superimposes an image based on the GUI data 322 on the image in the frame memory 341 so that the two images are combined with each other to produce a combined image. The image processing section 34 may output image data on the combined image combined in the frame memory 341 to the storage section 32 and cause the storage section 32 to store the image data as the projection image data 324. In a case where the projection control section 311 instructs the image processing section 34 to capture the projection image, the image processing section 34 may output the image data in the frame memory 341 to the storage section 32 and cause the storage section 32 to store the image data as the projection image data 324.

In the present embodiment, the single image processing section 34 processes the projection images P3 and P4. Further, the images processed by the image processing section 34 are formed by the single light modulator 352. In this case, the image processing section 34 may alternately develop the image projected by the projection section 35 and the image projected by the projection section 36 in the frame memory 341. Instead, the image processing section 34 may be so configured that the frame memory 341 has an area where the image projected by the projection section 35 is developed and an area where the image projected by the projection section 36 is developed.

The image processing section 34 outputs an image signal to the light modulator driving section 326 to cause the light modulator 352 to alternately form two images. The two images are the projection image P3 projected by the projection section 35 and the projection image P4 projected by the projection section 36. Specifically, the image processing section 34 updates the image formed in the light modulator 352 in a predetermined cycle, and the update cycle is determined as appropriate by the rotating speed of the motor 354, the ratio of the size of a light transmissive section 356 to the size of a flat surface 355a, and other factors.

The light source driving section 335 supplies the light source 351 with drive current and pulses to cause the light source 351 to emit light. The light source driving section 335 may be capable of adjusting the luminance of the light emitted from the light source 351. The light modulator driving section 336 drives the light modulator 352 on the basis of an image signal input from the image processing section 34 to draw an image in the light modulator 352 on a frame basis under the control of the control section 31.

The voice processing section 381 outputs voice via the loudspeaker 382 on the basis of input digital voice data or an input analog voice signal under the control of the control section 31.

In the projectors 11 and 13 described above, the projection sections 25, 26, 35, and 36 have been described as examples of the configuration in which different projection images are projected in two different directions. The configurations of the projection sections 25, 26, 35, and 36 are presented only by way of example. For example, the projector 13 may have the same configurations as those of the projection sections 25 and 26, or the projector 11 may have the same configurations as those of the projection sections 35 and 36. Instead, an optical part having no movable portion may be used to divide or distribute the modulated image light from the light modulator in a plurality of directions, and images may be projected in the plurality of directions. In addition, the configuration in which each of the projectors 11 and 13 projects different projection images in a plurality of directions can be arbitrarily changed.

Figure 6:
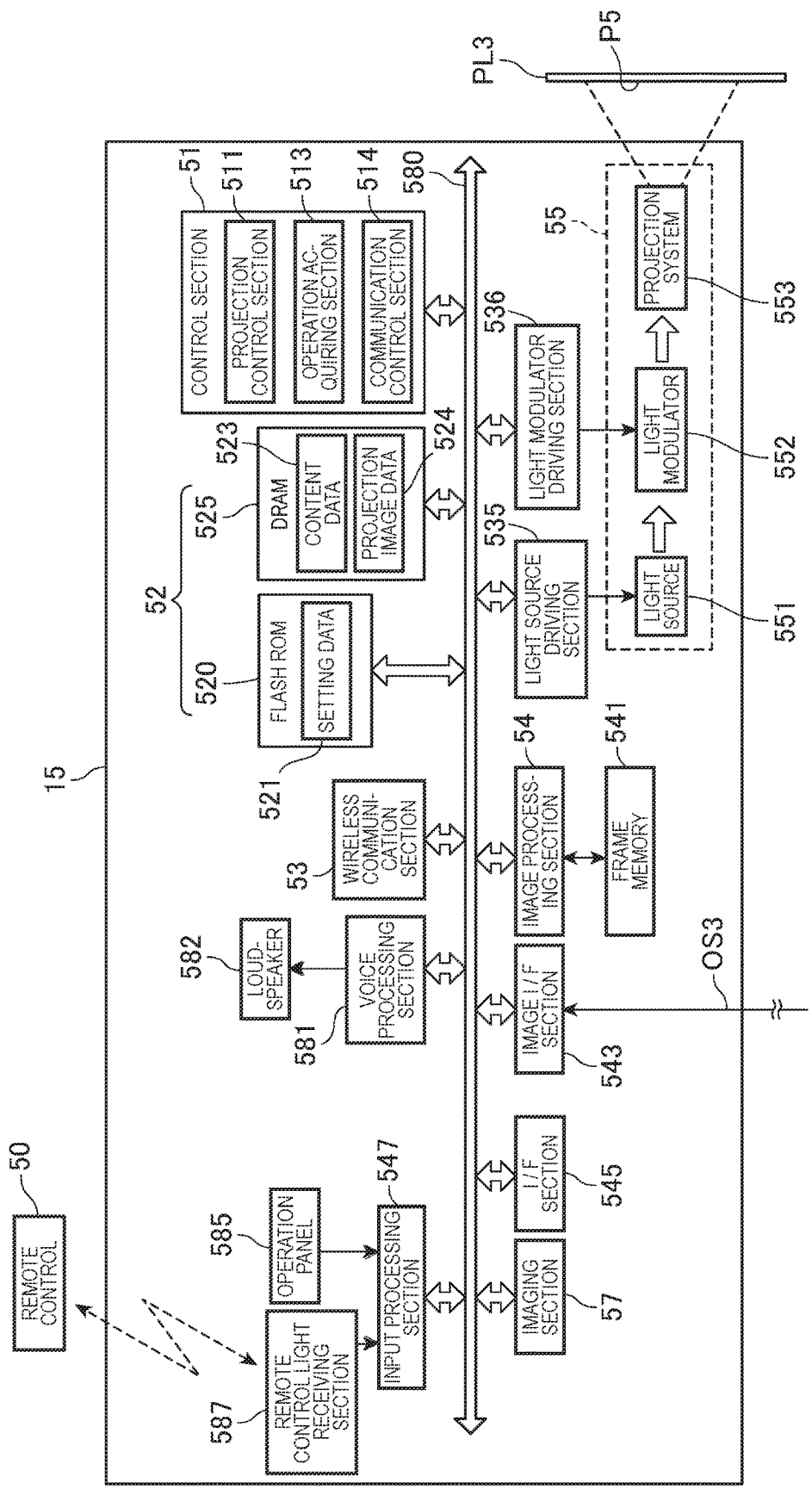
FIG. 6 is a block diagram of a projector.

FIG. 6 is a block diagram of the projector 15.

The projector 15 includes the control section 51, the storage section 52, the wireless communication section 53, the image processing section 54, and the projection section 55, as described above. The projector 15 further includes a light source driving section 535, a light modulator driving section 536, an image interface section 543, an interface section 545, an input processing section 547, and a voice processing section 581. The sections described above are connected to each other via a bus 580. Further, a frame memory 541 is connected to the image processing section 54, and an operation panel 585 and a remote control light receiving section 587 are connected to the input processing section 547, as will be described later. A loudspeaker 582 is connected to the voice processing section 581.

The image interface section 543 (second acquisition section) is an interface that connects the image source apparatus described above to the projector 15 and includes a connector, an interface circuit, and other components. The image interface section 543 may include a connector to which a card-shaped recording medium, such as an SD memory card, a USB memory device, or any other portable storage medium can be connected, and an interface circuit.

The image interface section 543 is not limited to the configuration in which it is wired to the image source apparatus. For example, the image interface section 543 may be configured to perform wireless data communication that complies with a wireless LAN (including Wi-Fi), Miracast (registered trademark), Bluetooth (registered trademark), or any other standard with the image source apparatus.

Digital image data in a data format that can be processed by the projector 15 is input to the image interface section 543. The digital image data may be still image data or motion image data. In the following description, data input from the image source apparatus to the image interface section 543 is called input image data OS3.

The image interface section 543 is not limited to an interface to which digital image data can be input and may, for example, have a configuration to which an analog image (video) signal can be input. In this case, the input image data OS3 may be an analog signal. In this case, the image interface section 543 may have the function of converting an analog signal into digital data.

The interface section 545 is connected to an external apparatus, such as a PC, and transmits and receives a variety of data, such as the control data, to and from the external apparatus. For example, the interface section 545 performs data communication that complies with Ethernet, IEEE 1394, USB, or any other standard.

The projection section 55 includes a light source 551, a light modulator 552, which modulates light emitted from the light source 551 to produce image light, and a projection system 553, which projects the modulated image light from the light modulator 552 on the flat surface PL3.

The light source 551 is formed of a halogen lamp, a xenon lamp, an ultrahigh-pressure mercury lamp, or any other lamp or an LED, a laser light source, or any other solid-state light source. The light source 551 is turned on by using electric power supplied from the light source driving section 535 and emits light toward the light modulator 552.

The light modulator 552 modulates the light emitted from the light source 551 to produce image light and irradiates the projection system 553 with the image light.

The light modulator 552 includes, for example, a transmissive liquid crystal light valve, a reflective liquid crystal light valve, a digital mirror device, or any other light modulating element. The light modulator driving section 536 is connected to the light modulating element of the light modulator 552. The light modulator driving section 536 drives the light modulator 552 on the basis of an image signal outputted from the image processing section 54. The light modulator driving section 536 drives the light modulating element of the light modulator 552 to set the grayscale of each pixel so that an image is drawn on a frame (screen) basis in the light modulating element.

The projection system 553 includes a lens and a mirror that focus the light modulated by the light modulator 552 on a screen. The projection system 553 may further include a zoom lens, a focus lens, and a variety of other lenses or lens groups.

The input processing section 547 accepts the user's operation.

The input processing section 547 detects operation performed on the operation panel 585. The operation panel 585 is disposed, for example, on the enclosure of the projector 15 and includes a variety of switches. The input processing section 547 detects operation performed on any of the switches on the operation panel 585 and outputs control data representing the operated switch to the control section 51.

The remote control light receiving section 587, which is connected to the input processing section 547, receives an infrared signal transmitted from a remote control 50 and decodes the received signal. The remote control 50 includes a variety of switches and transmits an infrared signal representing an operated switch. The remote control light receiving section 587 decodes the received signal and outputs data on the decoded signal to the input processing section 547. The input processing section 547 outputs the data input from the remote control light receiving section 587 to the control section 51.

The control section 51 includes, for example, a CPU, a flash ROM, and a RAM that are not shown. The control section 51, in which the CPU executes a program stored in the flash ROM or the storage section 52, controls each portion of the projector 15. The control section 51 includes a projection control section 511, an operation acquiring section 513, and a communication control section 514 as functional blocks that control the portions of the projector 15. The functional blocks are achieved by cooperation between software and hardware when the CPU of the control section 51 executes the program.

The projection control section 511 controls the image processing section 54, the light source driving section 535, the light modulator driving section 536, and other portions to control the projection of the projection image P5 performed by the projector 15. The projection control section 511 controls the timing when a process carried out by the image processing section 54 is carried out, a condition under which the process is carried out, and other factors associated with the process. The projection control section 511 further controls the light source driving section 535 to, for example, adjust the luminance of the light emitted from the light source 551.

The projection control section 511 selects an image source of the projection image P5 on the basis of the user's operation acquired by the operation acquiring section 513. The projection control section 511 controls the image processing section 54 to cause it to acquire image data from the selected image source.

The projection control section 511 further performs projection image switching control in which the projection image P5 is switched to the projection image P1 or P2 projected by the projector 11, the projection image P3 or P4 projected by the projector 13, or any other image. In this case, the projection control section 511 changes the image source of the projection image P5 to the image data transmitted from the projector 11 or 13 and temporarily stored in the storage section 52.

The projection control section 511 further causes the projector 11 or 13 to project the projection image P5. In this case, the projection control section 511 transmits the image data on the projection image P5 in accordance with the control data transmitted from the projector 11 or 13 under the control of the communication control section 514.

The projection control section 511 further controls the imaging section 57 to cause it to perform imaging to acquire captured image data. The projection control section 511 may perform projection by using the acquired captured image data as the image source. The projection control section 511 may instead temporarily store the captured image data from the imaging section 57 in a DRAM 525 and, for example, transmit the captured image data to another projector. The imaging section 57 is an imaging section so disposed as to image, for example, the flat surface PL3. More specifically, the imaging section 57 may perform imaging over a viewing angle containing the projection image P5. In this case, the imaging section 57 can image the projection image P5 projected by the projector 15. Further, for example, in a case where a diagrammatic picture of an actual object is placed on the flat surface PL3 and the projector 15 projects the projection image P5 in such a way that the projection image P5 is superimposed on the diagrammatic picture, an image captured with the imaging section 57 contains the projection image P5 superimposed on the diagrammatic picture of the actual object. That is, image data on the state in which the projection image P5 is superimposed on the diagrammatic picture of the actual object can be produced.

The operation acquiring section 513 detects operation performed on the projector 15. The operation acquiring section 513 detects operation performed via the remote control 50 and the operation panel 585, which function as input devices, on the basis of data input from the input processing section 547.

The storage section 52 is a storage device that stores data processed by the control section 51 and the program executed by the CPU of the control section 51. The storage section 52 can be configured to include a variety of volatile storage devices and/or nonvolatile storage devices. In the present embodiment, the storage section 52 includes a flash ROM 520 and the DRAM 525. The flash ROM 520 is configured in the same manner as the flash ROM 220, and the DRAM 525 is configured in the same manner as the DRAM 225. The flash ROM 520 stores setting data 521, and the DRAM 525 stores content data 523 and projection image data 524. When the projector 15 is powered off, the content data 523 and the projection image data 524 may be saved in the flash ROM 520.

The setting data 521 contains a variety of setting values (parameters) that specify actions of the projector 15. The setting data 521 contains, for example, setting values that allow the projector 15 to perform wireless data communication over the communication network 10. Specifically, the setting data 511 contains identification information, such as the network addresses and the IDs of the projectors 11, 13, and 15 and the wireless communication apparatus 9, and authentication information, such as pass phrases thereof. The setting data 521 may further contain data that specifies the type or content of image processing performed by the image processing section 54 and parameters used in the image processing.

The content data 523 contains still image data or motion image data that can be selected as an image source. The content data 523 may contain voice data.

The projection image data 524 contains image data received from the projector 11 or 13. That is, in a case where the projector 15 receives image data on a projection image from the projector 11 or 13, the received image data is stored as the projection image data 524.

The frame memory 541 is connected to the image processing section 54.

The image processing section 54 acquires image data from an image source selected under the control of the control section 51 and performs a variety of types of image processing on the acquired image data. For example, the image processing section 54 carries out a resolution conversion process of converting the resolution of the image data in accordance with the display resolution of the light modulator 552. The image processing section 54 further carries out a geometric correction process of correcting the shape of the image, a color tone correction process of correcting the color tone of the image data, and other processes. The image processing section 54 produces an image signal for displaying the processed image data and outputs the image signal to the light modulator driving section 536.

To perform image processing, the image processing section 54 develops an image based on image data acquired from an image source in the frame memory 541 and performs a variety of types of processing on the image developed in the frame memory 541.

The image processing section 54 outputs the image signal to the light modulator driving section 536 to cause the light modulator 552 to form an image.

The light source driving section 535 supplies the light source 551 with drive current and pulses to cause the light source 551 to emit light. The light source driving section 535 may be capable of adjusting the luminance of the light emitted from the light source 551. The light modulator driving section 536 drives the light modulator 552 on the basis of an image signal input from the image processing section 54 to draw an image in the light modulator 552 on a frame basis under the control of the control section 51.

The voice processing section 581 outputs voice via the loudspeaker 582 on the basis of input digital voice data or an input analog voice signal under the control of the control section 51.

FIG. 7 shows an example of the GUI operation in the projection system 1.

The user who operates the projection system 1 can perform GUI operation using the pointing element 201 on the projector 11. The operation of the projector 11 will be described below, and the user can similarly perform GUI operation using the pointing element 203 on the projector 13.

In the projection area where the projector 11 projects the projection image P1, a detection area 200, where a pointed position pointed with the pointing element 201 can be detected, is set. In the example shown in FIG. 7, the detection area 200 is so set as to be slightly smaller than the projection image P1, but the detection area 200 may instead be larger than the projection image P1.

When the user operates the operation panel 285 or the remote control 20 to instruct start of the GUI operation or display of the menu bar, the control section 21 displays the menu bar 206 on the basis of the GUI data 222 stored in the storage section 22. The menu bar 206 (image for operation) contains a variety of icons for setting attributes of a figure drawn by operation of the pointing element 201. The attributes of a figure are the shape of the figure, the color, thickness, and other factors of lines that form the drawn figure. The user can specify an icon in the menu bar 206 by aligning the position of the front end 202 of the pointing element 201 with the icon for operation of specifying the attributes.

After operation that specifies the attributes of the figure, the user operates the pointing element 201 to produce a drawn image 205 along the trajectory of the front end 202, as shown, for example, in FIG. 7.

A display switching icon 207 is placed in the menu bar 206. The display switching icon 207 is an icon for instructing projection image switching, for example, for causing the projector 13 or 15 to display the projection image P1 or P2 projected by the projector 11. When the user operates the display switching icon 207 by using the pointing element 201, the control section 21 detects that image switching has been instructed and carries out the image switching process. In this case, the operation of the display switching icon 207 is followed, for example, by operation of selecting a switchover source image and a switchover destination image from the projection images P1 to P5.

Figure 8:
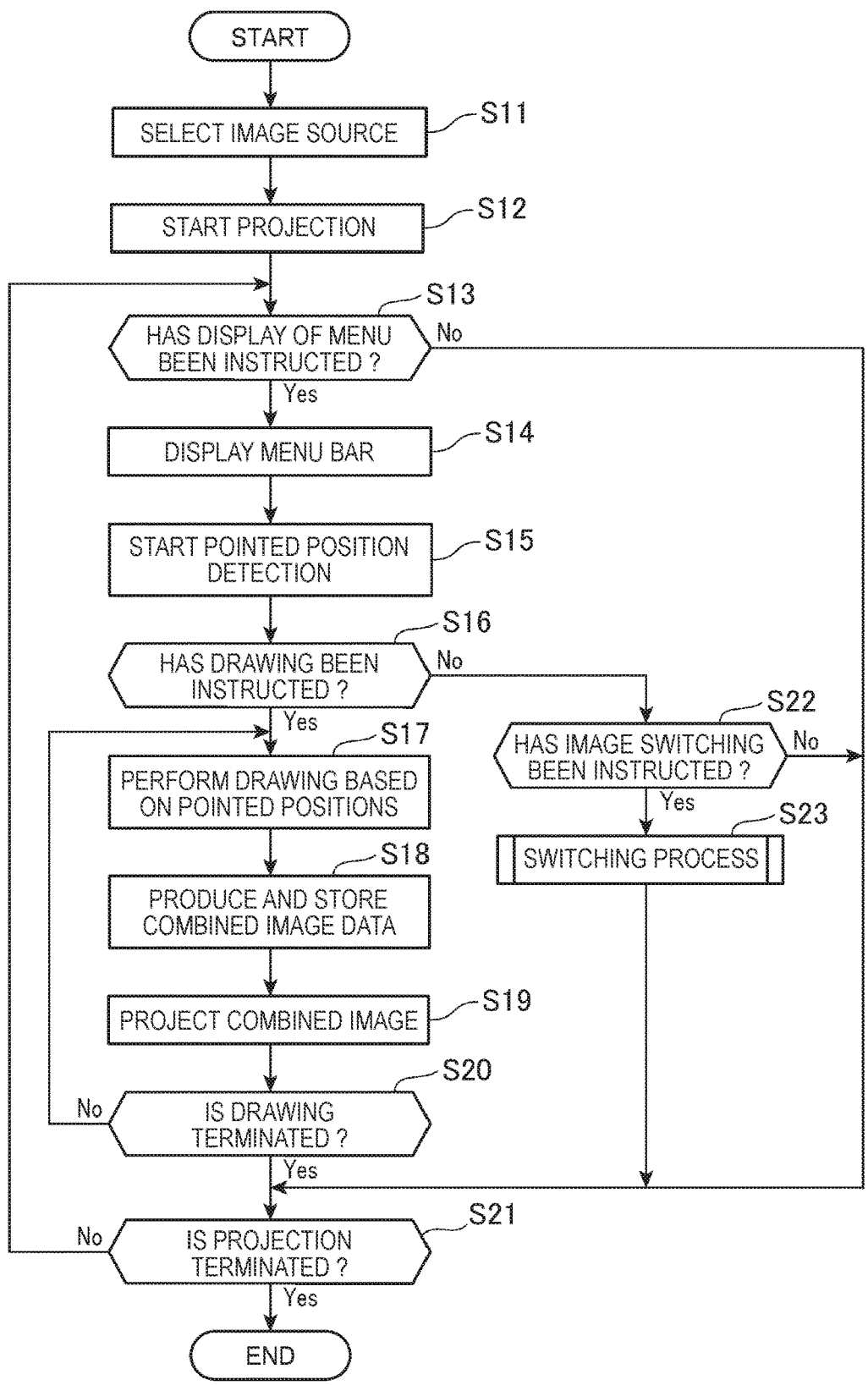
FIG. 8 is a flowchart showing actions of a projector.
Figure 9:
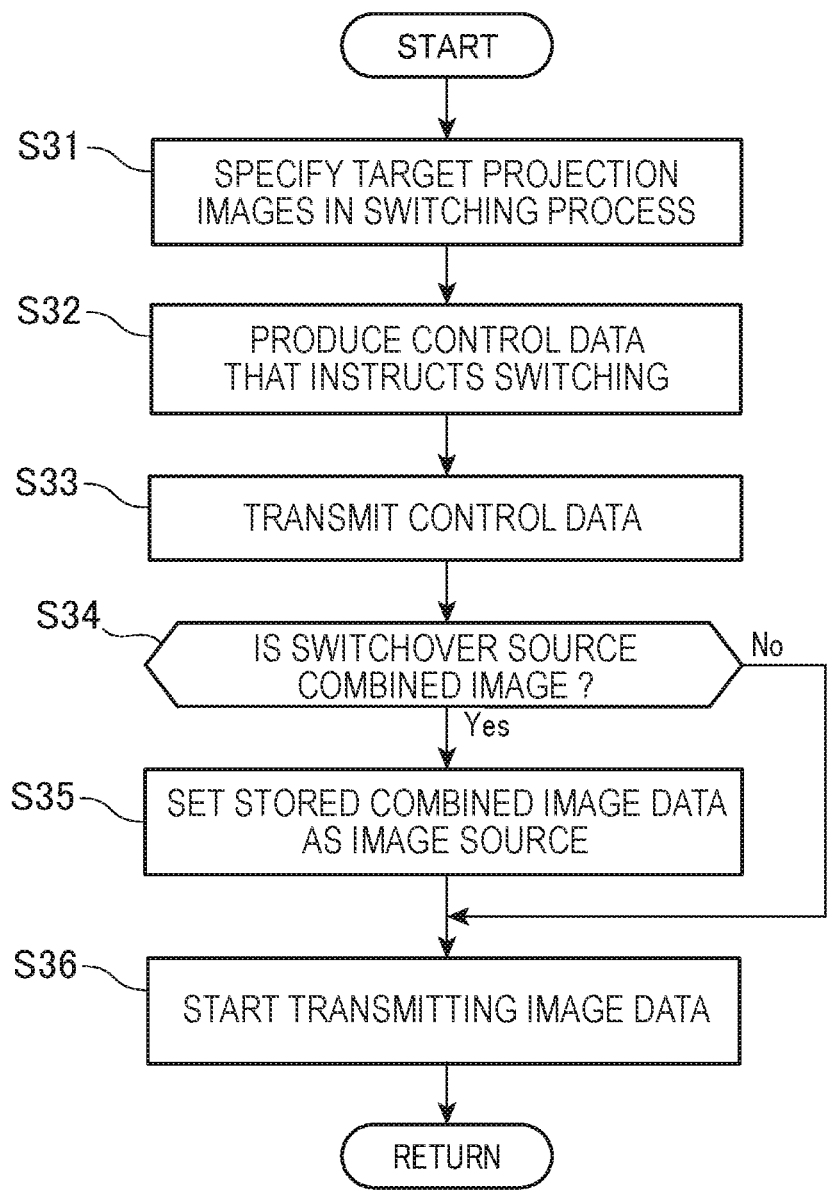
FIG. 9 is a flowchart showing actions of the projector.
Figure 10:
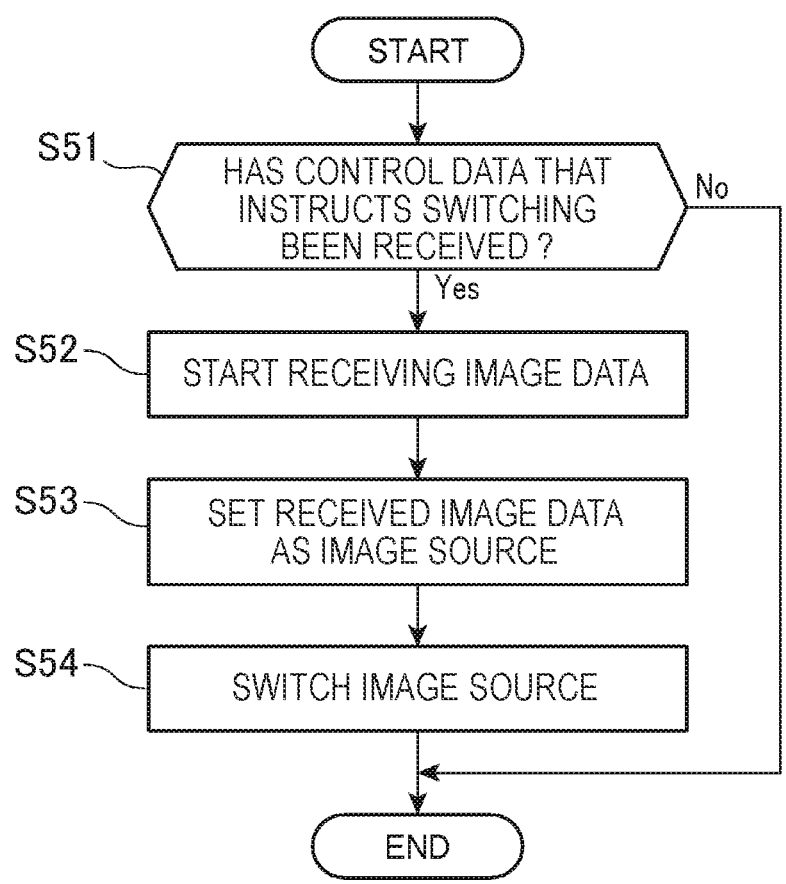
FIG. 10 is a flowchart showing actions of a projector.

FIGS. 8, 9, and 10 are flowcharts showing actions of the projection system 1. FIGS. 8 and 9, in particular, show actions performed by the projector 11 or 13 in accordance with a projection image switching instruction. Therefore, the actions in FIGS. 8 and 9 may be performed by the projector 11 or may be performed by the projector 13 and will be described as actions performed by the projector 11. FIG. 10 shows actions performed by any of the projectors 11, 13, and 15 in accordance with control data transmitted from any of the other projectors. In the following description, the actions will be described as those performed by the projector 15.

In short, the following description will be made of the action of switching the projection image P5 projected by the projector 15 to the projection image P1 or P2 projected by the projector 11 as an example of the actions of the projection system 1. In another expression, the projector 15 is caused to project the projection image P1 or P2. In this case, the projector 11 may switch the image projected by the projector 15 to the other one of the projection image P1 or P2.

The projector 11, after it is powered on, performs initial setting and other operation and then starts performing the actions in FIG. 8.

The control section 21 of the projector 11 selects an image source on a projection direction basis in accordance with the user's operation accepted by the input processing section 247 or the setting data 221 set in advance (step S11). Specifically, the control section 21 selects the image source of the projection image P1 and the image source of the projection image P2. The control section 21 causes the image processing section 24 to acquire image data from the selected image sources and causes the projection sections 25 and 26 to project the projection images P1 and P2, respectively (step S12). It is noted that no image source may be selected for one of or both the projection section 25 (projection image P1) nor the projection section 26 (projection image P2). Any of the projection sections 25 and 26 for which no image source is selected projects no image.

The control section 21 evaluates whether or not operation accepted by the input processing section 247 has instructed display of the menu bar 206 (step S13). In a case where the display of the menu bar 206 has been instructed (Yes in step S13), the control section 21 causes the projection section 25 to display the menu bar 206 on the basis of the GUI data 222 (step S14). At this point, the control section 21 starts pointed position detection performed by the position detecting section 27 and therefore transitions to the state that allows the user to perform operation by using the pointing element 201 (step S15).

The control section 21 waits for operation performed on the menu bar 206 and evaluates whether or not drawing has been instructed (step S16). In a case where drawing has been instructed (Yes in step S16), the control section 21 performs drawing on the basis of pointed positions detected by the position detecting section 27 (step S17), causes the image processing section 24 to produce combined image data, and causes the storage section 22 to store the combined image data (step S18). The control section 21 causes the image processing section 24 and the projection section 25 to project the combined image (step S19).

The control section 21 evaluates whether or not drawing termination has been instructed (step S20), and in a case where the drawing is not terminated (No in step S20), the control section 21 returns to step S17. In a case where drawing termination has been instructed (Yes in step S20), the control section 21 evaluates whether or not the projection being performed by the projector 11 is terminated (step S21). In step S21, the control section 21 performs the evaluation based, for example, on whether or not operation accepted by the input processing section 247 has instructed projection termination or power-off of the projector 11. In a case where the projection is terminated (Yes in step S21), the control section terminates the present process. In a case where the projection is not terminated (No in step S21), the control section 21 returns to step S13.

In a case where display of the menu bar 206 has not been instructed in step S13 (No in step S13), the control section 21 proceeds to step S21.

In a case where drawing has not been instructed in step S16 (No in step S16), the control section 21 evaluates whether or not image switching has been instructed (step S22). In a case where no image switching has been instructed (No in step S22), the control section 21 proceeds to step S21. In a case where image switching has been instructed (Yes in step S22), the control section 21 carries out the process of switching projection images in the projection system 1 (step S23).

FIG. 9 is a flowchart showing the switching process in detail.

In the switching process, a switchover source projection image and a switchover destination projection image are specified by operation accepted by the input processing section 247 or GUI operation using the pointing element 201 (step S31). The switching process is the process of swapping some of the projection images P1 to P5 projected by the projection system 1. In more detail, the switching process is the process of causing any of the projection images P1 to P4 projected by the projectors 11 and 13 to be projected as any of the other projection images out of projection images P1 to P5 projected by the projectors 11, 13, and 15. In another expression, the switching process is the process of replacing any of the projection images P1 to P5 with any of the projection images P1 to P4.

In step S31, target projection images in the switching process are specified. The target projection images in the switching process include a switchover source projection image and a switchover destination projection image. In the description, the projector 15 is caused to project the projection image P1 projected by the projector 11, as described above. That is, the projection image P5 is switched to the projection image P1. In the example, the switchover source is the projection image P1, and the switchover destination is the projection image P5. The switchover source projection image and the switchover destination projection image may be projection images projected by the same projector.

In the switching process, the control section 21 produces control data that instructs a projector that projects a switchover destination projection image to perform the projection image switching (step S32). The control section 21 causes the wireless communication section 23 to transmit the produced control data to the projector that projects the switchover destination projection image (step S33).

The control section 21 evaluates whether or not the switchover source projection image is a combined image (step S34). In a case where the switchover source projection image is a combined image (Yes in step S34), the control section 21 sets the combined image data stored in the storage section 22 as the image source (step S35).

The image processing section 24, when it produces a combined image, stores the image data on the combined image in the storage section 22, as described in step S18 (FIG. 8). In a case where the switchover source projection image is a combined image, the control section 21 sets the combined image data stored in the storage section 22 as the switchover source image source (step S35). The control section 21 starts transmitting the image data set as the image source (step S36). After step S36, the wireless communication section 23 transmits the image data specified by the control section 21 to the projector 15 that projects the switchover destination projection image.

In a case where the switchover source projection image is not a combined image (No in step S34), the control section 21 proceeds to step S36 and starts transmitting image data set as the image source of the switchover source projection image (step S36).

As described above, in the case where projection image switching has been instructed, for example, by GUI operation using the pointing element 201, the projector 11 can cause another projector, the projector 13 or 15, to project the image being projected as the projection image P1 or P2. The actions shown in FIGS. 8, 9, and 10 are not necessarily performed by the projector 11 and may instead be performed, for example, by the projector 13. That is, the switchover source projection image may instead be the projection image P3 or P4.

The projector that projects the switchover destination projection image receives the control data transmitted by the projector 11 in step S33 (FIG. 9) and performs the actions shown in FIG. 10. The actions shown in FIG. 10 will be described as those of the projector 15. That is, the switchover destination projection image is the projection image P5.

The control section 51 of the projector 15 waits for reception of the control data transmitted by the switchover source projector (step S51). The control data is the control data transmitted by the projector 11 in step S33 in FIG. 9. In a case where no control data has been received (No in step S51), the control section 51 terminates the present process.

In a case where the control data that instructs projection image switching has been received (Yes in step S51), the control section 51 starts receiving image data to be projected (step S52). The image data is the image data transmitted, for example, by the projector 11 in step S36 in FIG. 9. At this point, the control section 51 stores the received image data as the projection image data 524 in the storage section 52.

The control section 51 sets the received image data as the image source of the projection image P5 (step S53). The control section 51 stores the image data received by the wireless communication section 53 after step S52 in the storage section 52 as the projection image data 524 and therefore sets the projection image data 524 as the image source.

Assume, as an example, a case where the user plays the role of a teacher and uses the projection system 1 for education (class, lecture) or other presentation (such as seminar) purposes. In this case, a lecture or a presentation can be performed by causing the projector 11 to project the projection image P1 from image sources, such as document data, still image data on figures for presentation, and motion image data. In this state, it is conceivable that the user desires to show, while showing the projection image P1 to the audience (lecture participants, pupils, students), another document or image. In this case, the user can operate the projector 11 to perform the projection image switching. The content projected in the form of the projection image P1 can therefore be projected as the projection image P2 on the flat surface PL4 or by the projector 13 or 15. Therefore, the image shown to the audience can be shown continuously, and another image can be shown in the form of the projection image P1.

The projector 11 can draw a figure in correspondence with operation of the pointing element 201 by using the function of the image processing section 24, as illustrated in FIG. 7. The projector 11 can further project a drawn image in such a way that the drawn image is superimposed on the image source of the projection image P1. Specifically, in a state in which a document is projected as the projection image P1, lines and letters drawn in accordance with operation of the pointing element 201 can be superimposed on the document to form a combined image, and the combined image can be projected as the projection image P1. Further, the projector 11 may combine the document data, which is the image source, with, for example, another still image data in such a way that the still image data is superimposed on the document data by using the function of the image processing section 24 and may project the resultant combined image as the projection image P1.

In this case, the projection system 1 can project the combined image, which is projected as the projection image P1, as the projection image P2 or any of the projection images P3 to P5.

Further, the projection image switching process can be carried out again in such a way that the image projected as the projection image P2 or any of the projection images P3 to P5 is restored to the projection image P1. For example, during a class or a lecture, in a state in which an image of a sentence, a figure, a material, or any other piece of information is projected as the projection image P1, in a case where it is desired that another image is projected in place of the projection image P1, the projection image P1 can be transferred to the ceiling (flat surface PL4) or another projection surface of the room (flat surface PL2 or PL3).

To use the approach described above with a typical projector of related art, for example, the image being projected is captured, the captured image data is stored, and the projection image is temporarily deleted. Thereafter, the captured image data is read and reproduced as required. As compared with the approach described above, according to the function of the projection system 1, the teacher and audience can advantageously view a single image or a plurality of images moved to other projection surfaces anytime as required. That is, the user who is the teacher primarily uses the projection image P1 and can freely swap the image projected as the projection image P1 and an image projected as any of the other projection images, the projection images P2 to P5. The lecture and presentation can therefore be given by simultaneously using the projection images P1 to P5.

When the projection image switching is performed, the projectors 11 and 13 may change the orientation of the projection images P2 and P4 projected on the flat surface PL4. The orientation changing action can be achieved by the process of reversing an image formed by the image processing section 24 in the frame memory 241 upside down or rotating the image by 180°. The same holds true for an image formed by the image processing section 34 in the frame memory 341. In this case, the directions of the projection images P2 and P4 can be switched to directions that allow users who face the flat surfaces PL1 and PL3 to readily view the projection images P2 and P4 and directions that allow the audience present in positions away from the flat surfaces PL1 and PL3 to readily view the projection images P2 and P4.

In the configuration described above, the projectors 11 and 13 can perform the actions shown in FIGS. 8 and 9, and the projectors 11, 13, and 15 can perform the actions shown in FIG. 10. In the projection system 1, the projectors that can perform the actions shown in FIGS. 8 and 9 may be limited to a specific projector. For example, the projector 11 may be configured to be capable of performing the actions described above, and the projector 13 may be configured not to perform the function of transmitting the control data that instructs projection image switching. Further, the projector 13 may be configured not to perform drawing or GUI operation using the pointing element 203. In this case, the projector 13 may be configured to be incapable of performing operation using the pointing element 203, or the projector 13 may be so configured that a specific setting on the projector 13 restricts the action and operation described above.

The above configuration has been described with reference to the case where the projection image P1 from the projector 11 is projected as the projection image P5 from the projector 15. Instead, the two projection images from the projectors 11 and 15 may be interchanged. The same holds true for interchange of two projection images between the projectors 13 and 15 and between the projectors 11 and 13. In this case, for example, in a case where the projection image P1 is the switchover source and the projection image P3 is the switchover destination, the switching may be so performed that not only does the projector 13 project the projection image P1 but the projector 11 projects the projection image P3.

Further, the present embodiment shows the configuration byway of example in which the projection system 1 includes the projectors 11 and 13 as projectors capable of projecting projection images in two directions. That is, the present embodiment describes the case using the projector 11, which includes the two light sources 251 and 261 and the two light modulators 252 and 262, and the projector 13, which includes the single light source 351 and the single light modulator 352, but the invention is not limited thereto. For example, the projection system 1 may be configured to include one of the projector 11 and the projector 13. The projection system 1 may instead be configured to include one or more projectors 11 or one or more projectors 13 or may still instead be configured to include any of the projectors 11 and 13 described above and the projector 15.

As described above, the projection system 1 according to the embodiment includes a first projector that projects an image on the basis of image data in a first projection direction and a second projector that projects an image on the basis of image data in a second projection direction. The projection system 1 further includes a storage section that stores the image data representing the image projected by the first projector and can switch the image projected by the second projector to the image based on the image data stored in the storage section.

The projectors 11 and 13 can be used as the first projector.

In a first aspect of the invention, the projector 11 corresponds to the first projector, and the projector 13 and/or the projector 15 corresponds to the second projector. The storage sections 22, 32, 52 correspond to the storage section.

In a second aspect, the projector 13 corresponds to the first projector, and the projector 11 and/or the projector 15 corresponds to the second projector. In the first and second aspects, the storage sections 22, 32, 52 correspond to the storage section.

According to the projection system 1, to which the invention is applied, and the method for controlling the projection system 1, the second projector can project the image projected by the first projector. In the first aspect, the projection image P1 or P2 projected by the projector 11 can be projected as the projection image P3 or P4 from the projector 13 or the projection image P5 from the projector 15. In the second aspect, the projection image P3 or P4 projected by the projector 13 can be projected as the projection image P1 or P2 from the projector 11 or the projection image P5 from the projector 15.

As described above, an image projected by any of the projectors 11 and 13 can be changed to another image, and the image before the change can be projected by any of the projectors 11, 13, and 15. The number of images projected by the projectors 11 and 13 can therefore be substantially increased. The projectors 11, 13, and 15 can therefore project a large amount of information.

The projection system 1 includes an acceptance section that accepts an instruction input and switches the image projected by the second projector to the image based on the image data stored in the storage section in accordance with the instruction input accepted by the acceptance section. In the first aspect, the input processing section 247 corresponds to the acceptance section. In this case, one or more of the projection images P3 and P4 projected by the projector 13 and the projection image P5 projected by the projector 15 can be switched to other projection images in accordance with the instruction input accepted by the input processing section 247. Image data on a switchover source image can be the projection image data 224 stored in the storage section 22, the projection image data 324 stored in the storage section 32, or the projection image data 524 stored in the storage section 52. In the second aspect, the input processing section 347 corresponds to the acceptance section. In this case, one or more of the projection images P1 and P2 projected by the projector 11 and the projection image P5 projected by the projector 15 can be switched to other projection images in accordance with the instruction input accepted by the input processing section 347. Image data on a switchover source image can be the projection image data 224 stored in the storage section 22, the projection image data 324 stored in the storage section 32, or the projection image data 524 stored in the storage section 52.

As described above, an image projected by any of the projectors 11, 13, and 15 can be switched to another in accordance with an instruction input in the projection system 1. An image projected by any of the projectors 11, 13, and 15 can then be projected by any of the remaining projectors out of the projectors 11, 13, and 15. In this case, the projectors 11, 13, and 15 do not need to be set in advance at the state in which no image is projected, whereby convenience provided by the projection system 1 can be improved.

The projection system 1 according to the embodiment of the invention includes the first projector and the second projector. The first projector includes a first acquisition section that acquires image data and a first projection section that projects an image on the basis of the image data acquired by the first acquisition section. The first projector further includes a first storage section that stores the image data representing the image projected by the first projection section and a first communication section that transmits the image data stored in the first storage section to the second projector. The second projector includes a second acquisition section that acquires image data and a second projection section that projects an image on the basis of the image data acquired by the second acquisition section. The second projector further includes a second communication section that receives the image data from the first projector and a second storage section that stores the image data received by the second communication section. The second projector can perform the action in which the second projection section projects the image on the basis of the image data acquired by the second acquisition section and the action in which the second projection section projects the image on the basis of the image data stored in the second storage section with the two actions switched from one to the other.

In the first aspect, the projector 11 includes the image interface section 243, which acquires image data, and the projection sections 25 and 26, which project images on the basis of the image data acquired by the image interface section 243. In this case, the projection section 25 or 26 corresponds to the first projection section. The projector 11 further includes the storage section 22, which stores the projection image data 224, which is image data on images projected by the projection sections 25 and 26, and the wireless communication section 23, which transmits the projection image data 224 to the projector 13 or 15. The projector 13 includes the image interface section 343, which acquires image data, and the projection sections 35 and 36, which project images on the basis of the image data acquired by the image interface section 343. In this case, the projection section 35 or 36 corresponds to the second projection section. The projector 13 further includes the wireless communication section 33, which receives image data from the projector 11, and the storage section 32, which stores the image data received by the wireless communication section 33 as the projection image data 324. The projector 13 can perform the following actions performed via the projection sections 35 and 36: the action of projecting the image on the basis of the image data acquired by the image interface section 343; and the action of projecting the image on the basis of the projection image data 324, with the two actions switched from one to the other. In the case where the second projector is the projector 15, the projector 15 includes the image interface section 543, which acquires image data, and the projection section 55, which projects an image on the basis of the image data acquired by the image interface section 543. The projector 15 further includes the wireless communication section 53, which receives image data from the projector 11, and the storage section 52, which stores the image data received by the wireless communication section 53 as the projection image data 524. The projector 15 can perform the following actions performed via the projection section 55: the action of projecting the image on the basis of the image data acquired by the image interface section 543; and the action of projecting the image on the basis of the projection image data 524, with the two actions switched from one to the other.

An image from the projector 11 or 13 can thus be projected by any of the remaining projectors out of the projectors 11, 13, and 15. Therefore, in a case where an image projected by the projector 11 or 13 is changed to another image, the image before the change can be projected by the other one of the projectors 11, 13, and 15 whereby the number of images projected by the projectors 11 and 13 can be substantially increased. The projectors 11, 13, and 15 can therefore project a larger amount of information.

In the projection system 1, the first projector includes a switching control section that produces control data that instructs the second projector to perform image switching and causes the first communication section to transmit the control data to the second projector. The second projector, when it receives the control data via the second communication section, switches the action in which the second projection section projects the image on the basis of the image data acquired by the second acquiring section to the action in which the second projection section projects the image on the basis of the image data stored in the second storage section and vice versa.

In the first aspect, the control section 21 of the projector 11 corresponds to the switching control section. The projector 11 includes the control section 21, which produces control data that instructs the projector 13 or 15 to perform image switching and causes the wireless communication section 23 to transmit the control data to the projector 13 or 15. The projector 13, when it receives the control data via the wireless communication section 23, can switch the action thereof between the actions described above. That is, the projector 13 switches the following actions performed via the projection sections 35 and 36 from one to the other: the action of projecting the image on the basis of the image data acquired by the image interface section 343; and the action of projecting the image on the basis of the projection image data 324 stored in the storage section 32. Further, the projector 15, when it receives the control data via the wireless communication section 53, can switch the action thereof between the actions described above. That is, the projector 15 switches the following actions performed via the projection section 55 from one to the other: the action of projecting the image on the basis of the image data acquired by the image interface section 543; and the action of projecting the image on the basis of the projection image data 524 stored in the storage section 52.

In the second aspect, the projector 13 includes the control section 31, which produces control data that instructs the projector 11 or 15 to perform image switching and causes the wireless communication section 33 to transmit the control data to the projector 11 or 15. The projector 11, when it receives the control data via the wireless communication section 33, can switch the action thereof between the actions described above. That is, the projector 11 switches the following actions performed via the projection sections 25 and 26 from one to the other: the action of projecting the image on the basis of the image data acquired by the image interface section 243; and the action of projecting the image on the basis of the projection image data 224 stored in the storage section 22. Further, the projector 15, when it receives the control data via the wireless communication section 53, can switch the action thereof between the actions described above. That is, the projector 15 switches the following actions performed via the projection section 55 from one to the other: the action of projecting the image on the basis of the image data acquired by the image interface section 543; and the action of projecting the image on the basis of the projection image data 524 stored in the storage section 52.

Transmission of the control data from the projector 11 or 13 therefore allows an image projected by any of the remaining projectors out of the projectors 11, 13, and 15 to be switched to the image projected by the projector 11 or 13. The operation required to perform the projection image switching in the projection system 1 can therefore be simplified, whereby the convenience provided by the projection system 1 can be improved.

In the projection system 1, a first control section provided in the first projector allows projection of an image for operation on the basis of data representing the image for operation, the first projector includes an acceptance section that accepts operation performed on the image for operation projected by the first projection section, and the switching control section produces the control data on the basis of the operation accepted by the acceptance section and causes the first communication section to transmit the control data to the second projector.

In the first aspect, the control section 21 provided in the projector 11 corresponds to the first control section. The projector 11 can project the image for operation on the basis of the data representing the image for operation. For example, the GUI data 222 corresponds to the data representing the image for operation, and the menu bar 206 corresponds to the image for operation. The projector 11 includes the position detecting section 27, which accepts operation performed on the image for operation projected by the projection section 25 or 26. The control section 21 produces the control data on the basis of the operation accepted by the position detection section 27 and causes the wireless communication section 23 to transmit the control data to the projector 13 or 15.

In the second aspect, the control section 31 provided in the projector 13 corresponds to the first control section. The projector 13 can project the image for operation on the basis of the data representing the image for operation. For example, the GUI data 322 corresponds to the data representing the image for operation. The projector 13 includes the position detecting section 37, which accepts operation performed on the image for operation projected by the projection section 35 or 36. The control section 31 produces the control data on the basis of the operation accepted by the position detection section 37 and causes the wireless communication section 33 to transmit the control data to the projector 11 or 15.

Operation using the image for operation can thus readily instruct projection image switching in the projection system 1.

In the projection system 1, the first projector includes a position detecting section that detects a position input and an image producing section that produces an image on the basis of a position detected by the position detecting section. The first projection section projects an image based on combined image data formed of image data representing the image produced by the image producing section combined with the image data acquired by the first acquisition section. The first storage section stores the combined image data, and the first communication section transmits the combined image data stored in the storage section to the second projector.

In the first aspect, the projector 11 includes the position detecting section 27, which detects a position input, and the image processing section 24, which produces an image on the basis of a position detected by the position detection section 27. The projection section 25 or 26 projects an image based on combined image data formed of image data representing the image produced by the image processing section 24 combined with the image data acquired by the image interface section 243. The storage section 22 stores the combined image data as the projection image data 224, and the wireless communication section 23 transmits the combined image data stored in the storage section 22 to the projector 13 or 15.

In the second aspect, the projector 13 includes the position detecting section 37, which detects a position input, and the image processing section 34, which produces an image on the basis of a position detected by the position detection section 37. The projection section 35 or 36 projects an image based on combined image data formed of image data representing the image produced by the image processing section 34 combined with the image data acquired by the image interface section 343. The storage section 32 stores the combined image data as the projection image data 324, and the wireless communication section 33 transmits the combined image data stored in the storage section 32 to the projector 11 or 15.

Therefore, in a case where the projector 11 or 13 produces an image based on a position input and projects the image, the other projector can display a projection image containing the produced image.

In the projection system 1, the first projector includes a third projection section that projects an image in a direction different from the direction in which the first projection section projects an image. The first projector can cause the third projection section to project an image based on the image data acquired by the first acquisition section and an image based on the image data stored in the first storage section with the two images switched from one to the other.

In the first aspect, the projector 11 includes the projection section 26, which projects an image in a direction different from the direction in which the projection section 25 projects an image. The projector 11 cause the projection section 26 to project an image based on the image data acquired by the image interface section 243 and an image based on the image data stored in the storage section 22 with the two image switched from one to the other. In this aspect, the first projection section may be the projection section 25 and the third projection section may be the projection section 26, or vice versa.

In the second aspect, the projector 13 includes the projection section 36, which projects an image in a direction different from the direction in which the projection section 35 projects an image. The projector 13 can cause the projection section 36 to project an image based on the image data acquired by the image interface section 343 and an image based on the image data stored in the storage section 32 with the two images switched from one to the other. In this aspect, the first projection section may be the projection section 35 and the third projection section may be the projection section 36, or vice versa.

A projection image projected by the projector 11 or 13 can thus be projected by any of the remaining projectors out of the projectors 11, 13, and 15. Further, the projectors 11 and 13 can each project the projection image described above in a different direction. Projection images projected in a plurality of directions can therefore be switched from one to another with high flexibility, whereby the convenience provided by the projection system 1 can be further improved.

In the projection system 1, in a case where the third projection section displays the image based on the image data stored in the first storage section, the orientation of the image can be changed.

In the first aspect, when the projector 11 causes the projection section 26 to display the image based on the image data stored in the storage section 22 (projection image data 224, for example), the orientation of the image can be changed.

In the second aspect, when the projector 13 causes the projection section 36 to display the image based on the image data stored in the storage section 32 (projection image data 324, for example), the orientation of the image can be changed.

The projectors 11 and 13 can therefore each project a projection image in an orientation that allows a person who views the image to readily visually recognize the image.

In the projection system 1, the second projector includes a fourth projection section that projects an image in a direction different from a direction in which the second projection section projects an image, and the second projector can cause the fourth projection section to project an image based on the image data acquired by the second acquisition section and an image based on the image data stored in the second storage section with the two images switched from one to the other.

In the first aspect, the projector 13 includes the projection section 36, which projects an image in a direction different from the direction in which the projection section 35 projects an image. The projector 13 can cause the projection section 36 to project an image based on the image data acquired by the image interface section 343 and an image based on the image data stored in the storage section 32 (projection image data 324, for example) with the two images switched from one to the other.

In the second aspect, the projector 11 includes the projection section 26, which projects an image in a direction different from the direction in which the projection section 25 projects an image. The projector 11 can cause the projection section 26 to project an image based on the image data acquired by the image interface section 243 and an image based on the image data stored in the storage section 22 (projection image data 224, for example) with the two images switched from one to the other.

A projection image projected by the projector 11 or 13 can thus be projected by any of the remaining projectors out of the projectors 11, 13, and 15. Further, the projectors 11 and 13 can each project the projection image in a different direction. Projection images projected in a plurality of directions can therefore be switched from one to another with high flexibility, whereby the convenience provided by the projection system 1 can be further improved.

In the projection system 1, in a case where the fourth projection section projects the image based on the image data stored in the second storage section, the orientation of the image can be changed.

In the first aspect, when the projector 13 causes the projection section 35 to display the image based on the image data stored in the storage section 32 (projection image data 324, for example), the orientation of the image can be changed.

In the second aspect, when the projector 11 causes the projection section 25 to display the image based on the image data stored in the storage section 22 (projection image data 224, for example), the orientation of the image can be changed.

The projectors 11 and 13 can therefore each project a projection image in an orientation that allows a person who views the image to readily visually recognize the image.

The embodiment described above is merely an example of a specific aspect to which the invention is applied and is not intended to restrict the invention, and the invention can be applied in the form of different aspects. For example, the pointing elements 201 and 203 used by the user in the projection system 1 are each not limited to a pen-shaped pointing element, and the user's hand or finger, a laser pointer, a pointing rod, or any other object may be used, with the shape and size thereof not limited to a specific shape or size.

In the embodiment described above, the position detecting sections 27 and 37 image projection surfaces to identify the positions of the pointing elements 201 and 203, but not necessarily in the invention. For example, the imaging section 273 or 373 is not necessarily provided in the main body of the projector 11 or 13. The imaging sections 273 and 373 may be provided as portions separate from the main bodies of the projectors 11 and 13. The imaging sections 273 and 373 may perform imaging in the direction toward the side of the flat surfaces PL1 and PL2, which are projection surfaces, or in the direction toward the front thereof. Further, the projector 11 may detect an operation position on the basis of image data captured by a plurality of imaging sections 273. The same holds true for the projector 13.

The function that allows the position detecting section 27 of the projector 11 to detect operation of the pointing element 201 and/or the function that allows the position detecting section 37 of the projector 13 to detect operation of the pointing element 203 may be achieved as the function of another apparatus independent of the projectors 11 and 13.

At least part of the functional blocks shown in the block diagrams may be achieved by hardware or may be achieved by cooperation of hardware and software, and the configurations in which the independent hardware resources are arranged as shown in the diagrams are not necessarily employed.

Further, the program executed by each of the control sections may be stored in the storage section or another storage device (not shown). Further, the control section may acquire the program stored in an external device and execute the program.

The invention may be configured in an aspect of a program executed by a computer to achieve the method for controlling the projectors 11, 13, and 15 described above, a recording medium on which the programs is so recorded as to be readable by a computer, or a transmission medium that transmits the program. The recording medium described above can be a magnetic or an optical recording medium or a semiconductor memory device. Specific example of the recording medium may include a flexible disk, an HDD (hard disk drive), a CD-ROM (compact disk read only memory), a DVD (digital versatile disk), a Blu-ray (registered trademark) disc, a magneto-optical disk, a flash memory, and a portable recording medium, such as a card-shaped recording medium, or an immobile recording medium. The recording medium described above may instead be a RAM (random access memory), a ROM (read only memory), or an HDD or any other nonvolatile storage device that are internal storage devices provided in each apparatus provided in the projection system 1 or in an external apparatus connected to the apparatus.

In addition, the specific detailed configuration of each of other portions of the apparatus that form the projection system 1 can also be arbitrarily changed to the extent that the change does not depart from the substance of the invention.

What is claimed is:

1. A projection system comprising:
    a first projector that projects an image based on image data in a first projection direction;
    a second projector that projects an image based on image data in a second projection direction; and
    a storage section that stores the image data representing the image projected by the first projector,
    wherein the image projected by the second projector is allowed to be switched to the image based on the image data stored in the storage section.

2. The projection system according to claim 1 further includes an acceptance section that accepts an instruction input, wherein the image projected by the second projector is switched to the image based on the image data stored in the storage section in accordance with the instruction input accepted by the acceptance section.

3. A projection system comprising:
    a first projector including
    a first acquisition section that acquires image data,
    a first projection section that projects an image based on the image data acquired by the first acquisition section,
    a first storage section that stores the image data representing the image projected by the first projection section, and
    a first communication section that transmits the image data stored in the first storage section to the second projector; and
    a second projector including
    a second acquisition section that acquires image data,
    a second projection section that projects an image based on the image data acquired by the second acquisition section,
    a second communication section that receives the image data from the first projector, and
    a second storage section that stores the image data received by the second communication section,
    wherein the second projector can perform an action in which the second projection section projects the image based on the image data acquired by the second acquisition section and an action in which the second projection section projects the image based on the image data stored in the second storage section with the two actions switched from one to the other.

4. The projection system according to claim 3, wherein the first projector includes a switching control section that produces control data that instructs the second projector to perform image switching and causes the first communication section to transmit the control data to the second projector, and the second projector, upon reception of the control data via the second communication section, switches the action in which the second projection section projects the image based on the image data acquired by the second acquiring section to the action in which the second projection section projects the image based on the image data stored in the second storage section and vice versa.

5. The projection system according to claim 4, wherein the first projector projects an image for operation based on data representing the image for operation, and includes an acceptance section that accepts operation performed on the image for operation projected by the first projection section, and the switching control section produces the control data based on the operation accepted by the acceptance section and causes the first communication section to transmit the control data to the second projector.

6. The projection system according to claim 3, wherein the first projector includes a position detecting section that detects a position input, and an image producing section that produces an image based on a position detected by the position detecting section, the first projection section projects an image based on combined image data formed of image data representing the image produced by the image producing section combined with the image data acquired by the first acquisition section, the first storage section stores the combined image data, and the first communication section transmits the combined image data stored in the storage section to the second projector.

7. The projection system according to claim 3, wherein the first projector includes a third projection section that projects an image in a direction different from a direction in which the first projection section projects an image, and the first projector can cause the third projection section to project an image based on the image data acquired by the first acquisition section and an image based on the image data stored in the first storage section with the two images switched from one to the other.

8. The projection system according to claim 7, wherein in a case where the third projection section projects the image based on the image data stored in the first storage section, the orientation of the image can be changed.

9. The projection system according to claim 3, wherein the second projector includes a fourth projection section that projects an image in a direction different from a direction in which the second projection section projects an image, and the second projector can cause the fourth projection section to project an image based on the image data acquired by the second acquisition section and an image based on the image data stored in the second storage section with the two images switched from one to the other.

10. The projector according to claim 9, wherein in a case where the fourth projection section projects the image based on the image data stored in the second storage section, the orientation of the image can be changed.

11. A method for controlling a projection system including a first projector that projects an image based on image data in a first projection direction and a second projector that projects an image based on image data in a second projection direction, the method comprising storing the image data representing the image projected by the first projector and switching the image projected by the second projector to the image based on the stored image data.

12. A method for controlling a projection system including a first projector that projects an image based on image data in a first projection direction and a second projector that projects an image based on image data in a second projection direction, wherein the first projector causes a first acquisition section to acquire image data, projects an image based on the image data acquired by the first acquisition section, stores the image data on the projected image, and transmits the stored image data to the second projector, and the second projector causes a second acquisition section to acquire image data, projects an image based on the image data acquired by the second acquisition section, and receives the image data from the first projector, stores the received image data, and performs an action of projecting the image based on the image data acquired by the second acquisition section and an action of projecting the image based on the stored image data with the two actions switched from one to the other.

* * * * *